US008810493B2

United States Patent
Kimura et al.

(10) Patent No.: US 8,810,493 B2
(45) Date of Patent: Aug. 19, 2014

(54) DISPLAY SYSTEM, CONTROL SYSTEM, AND DISPLAY METHOD

(75) Inventors: Kazunori Kimura, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 12/526,243

(22) PCT Filed: Feb. 15, 2008

(86) PCT No.: PCT/JP2008/052578
§ 371 (c)(1),
(2), (4) Date: Aug. 6, 2009

(87) PCT Pub. No.: WO2008/099936
PCT Pub. Date: Aug. 21, 2008

(65) Prior Publication Data
US 2010/0259511 A1    Oct. 14, 2010

(30) Foreign Application Priority Data
Feb. 15, 2007  (JP) .................. 2007-035471

(51) Int. Cl.
*G09G 3/36*    (2006.01)
(52) U.S. Cl.
USPC ............. 345/94; 345/87; 345/88; 345/96; 345/100
(58) Field of Classification Search
USPC ............................................. 345/204
See application file for complete search history.

(56) References Cited

U.S. PATENT DOCUMENTS 5,448,259 A * 9/1995 Hidaka ........................ 345/99
2001/0043180 A1* 11/2001 Mori et al. .................... 345/87

FOREIGN PATENT DOCUMENTS

| JP | 6-110403 A | 4/1994 |
| JP | 11-237606 A | 8/1999 |
| JP | 2001255844 A | 9/2001 |
| JP | 2002-072994 A | 3/2002 |
| JP | 2003-295835 A | 10/2003 |
| JP | 2003280599 A | 10/2003 |
| JP | 3577455 B | 7/2004 |
| JP | 20081052578 | 3/2008 |

OTHER PUBLICATIONS

International Search Report fpr PCT/JP2008/052578 mailed Mar. 11, 2008.

* cited by examiner

*Primary Examiner* — Kevin M Nguyen
*Assistant Examiner* — Cory Almeida
(74) *Attorney, Agent, or Firm* — Sughrue Mion, PLLC

(57) ABSTRACT

To provide a display device which can reduce driving frequency of a controller and a driver for inputting a signal to the display device and increase brightness of a screen without increasing the driving frequency. The display device includes: a display screen having a plurality of pixels provided by corresponding to intersection points between scan lines and data lines; a scan line drive circuit which drives the scan lines; a data line drive circuit which drives the data lines; and a display device body having an image display control device which operates the drive circuit so as to sequentially and repeatedly display two or more types of images. The image display control device causes the scan line drive circuit to simultaneously select two or more scan lines for at least one type of image among the two or more types of images sequentially displayed.

21 Claims, 30 Drawing Sheets

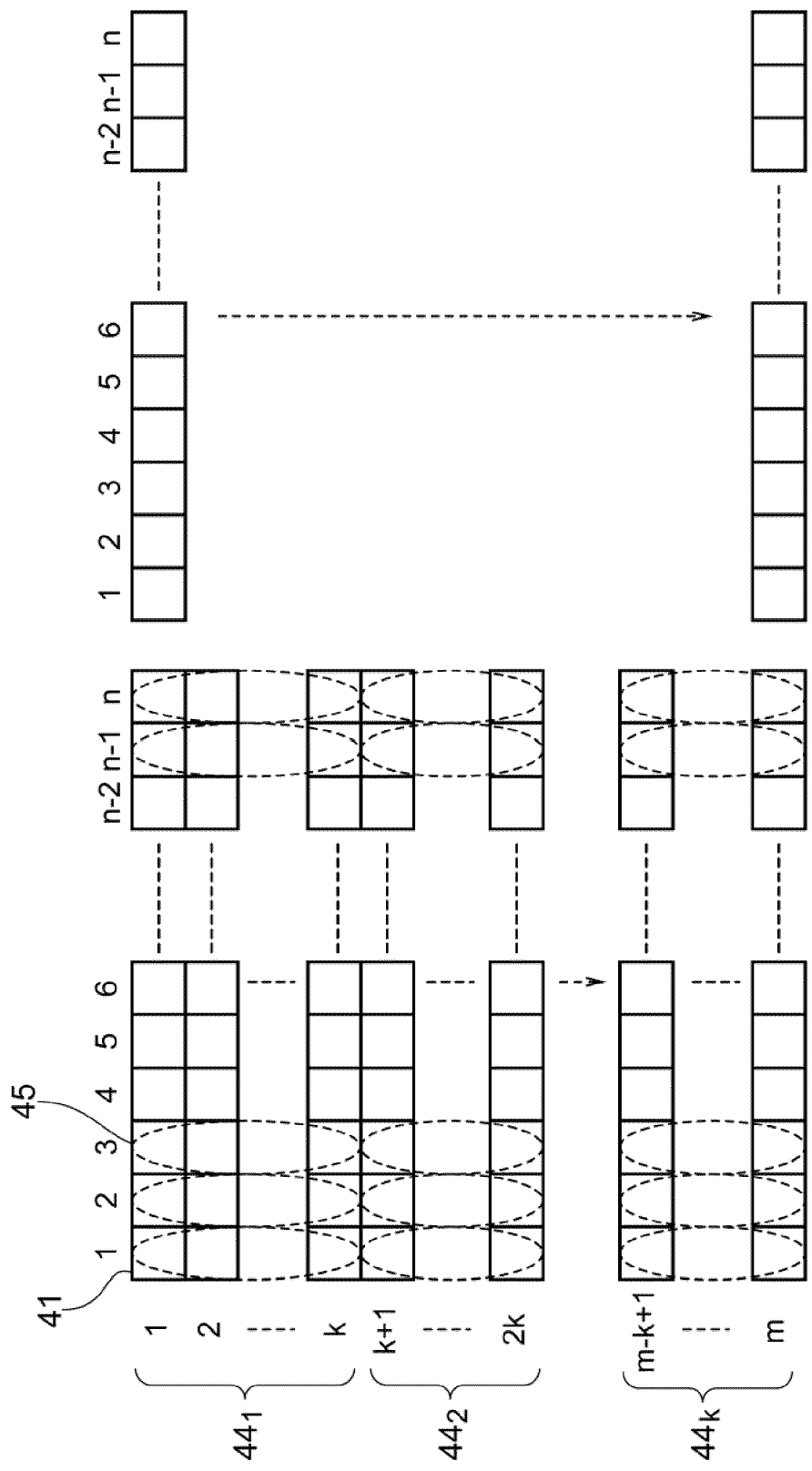

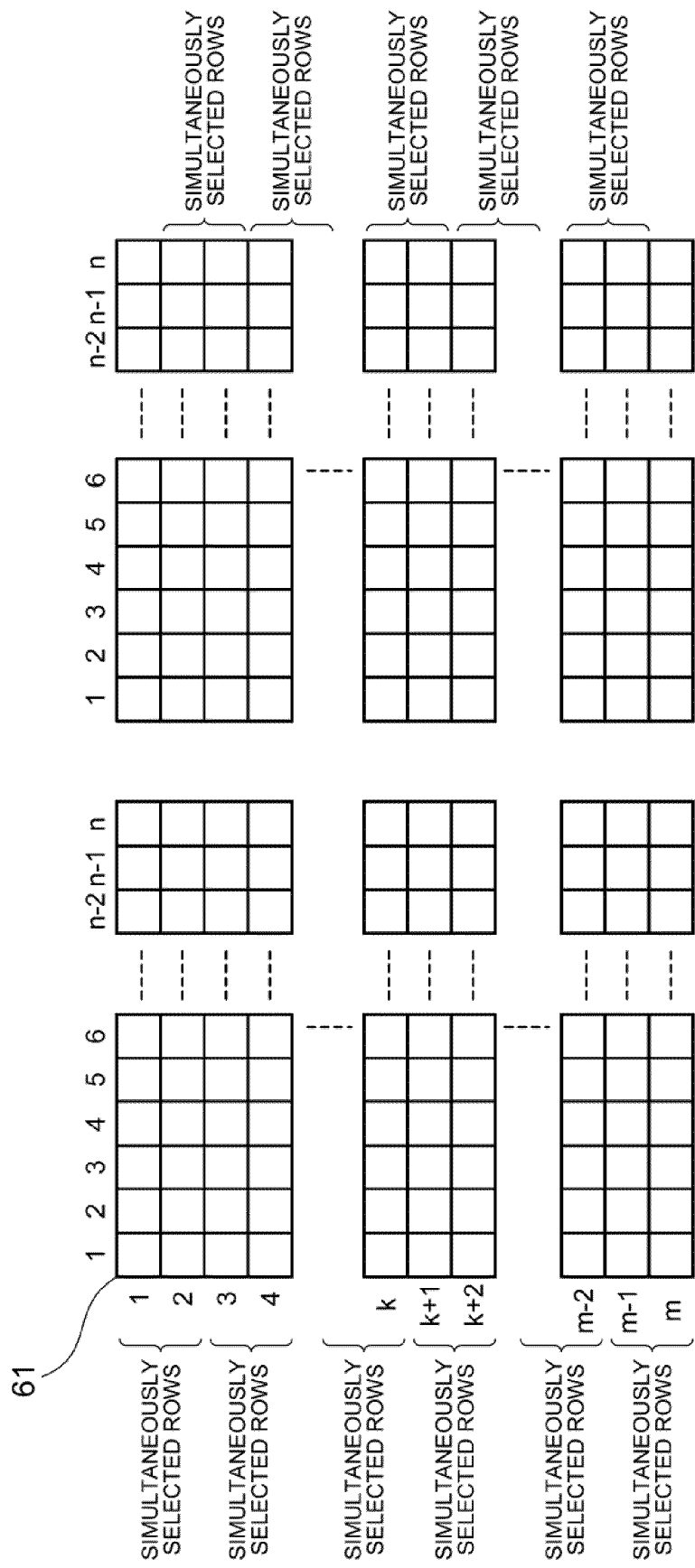

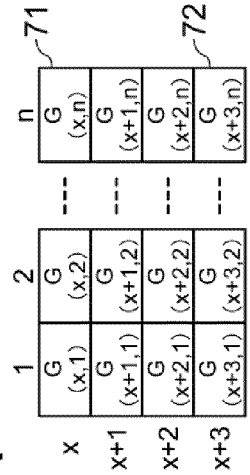

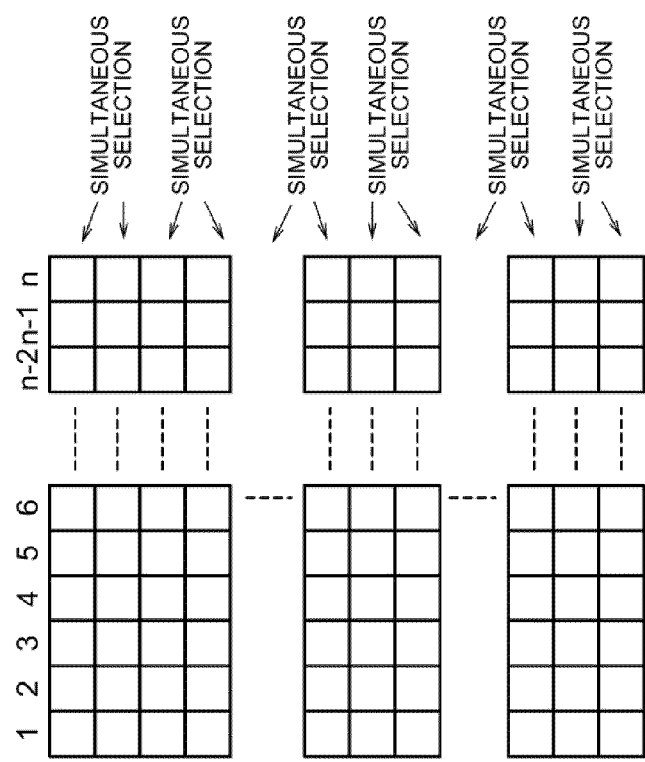
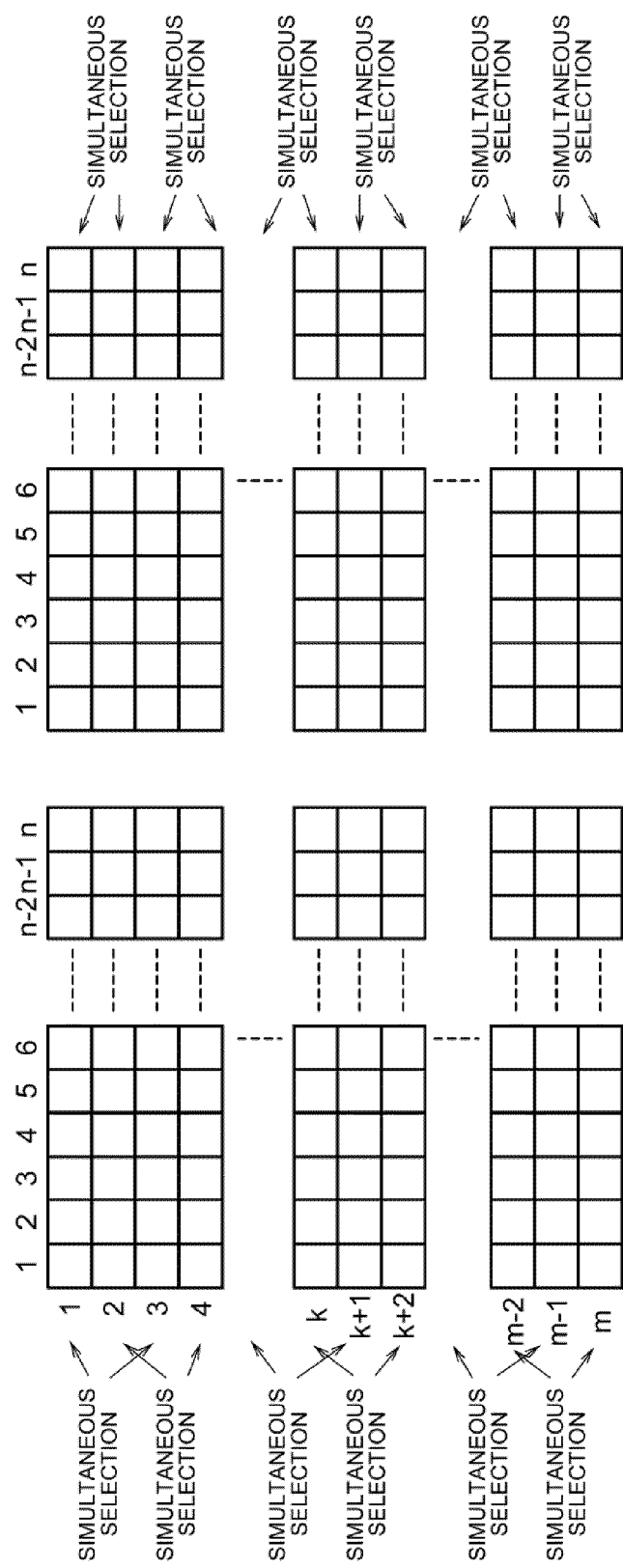

FIG. 12A

| | 1 | 2 | ... | n |
|---|---|---|---|---|
| x-1 | G(x-1,1) | G(x-1,2) | ... | G(x-1,n) |
| x | G(x,1) | G(x,2) | ... | G(x,n) |
| x+1 | G(x+1,1) | G(x+1,2) | ... | G(x+1,n) |
| x+2 | G(x+2,1) | G(x+2,2) | ... | G(x+2,n) |
| x+3 | G(x+3,1) | G(x+3,2) | ... | G(x+3,n) |

FIG. 12B

| | 1 | 2 | ... | n |
|---|---|---|---|---|
| x | G(x,1) | G(x,2) | ... | G(x,n) |
| x+1 | G(x+1,1) | G(x+1,2) | ... | G(x+1,n) |
| x+2 | G(x+2,1) | G(x+2,2) | ... | G(x+2,n) |
| x+3 | G(x+3,1) | G(x+3,2) | ... | G(x+3,n) |

SIMULTANEOUS SELECTION: x, x+2
SIMULTANEOUS SELECTION: x+1, x+3

FIG. 12C

| | 1 | 2 | ... | n |
|---|---|---|---|---|
| x-1 | G(x-1,1) | G(x-1,2) | ... | G(x-1,n) |
| x | G(x,1) | G(x,2) | ... | G(x,n) |
| x+1 | G(x+1,1) | G(x+1,2) | ... | G(x+1,n) |
| x+2 | G(x+2,1) | G(x+2,2) | ... | G(x+2,n) |

SIMULTANEOUS SELECTION: x-1, x+1
SIMULTANEOUS SELECTION: x, x+2

FIG. 12D

| | 1 | 2 | ... | n |
|---|---|---|---|---|
| x-1 | 42 | G(x-1,2) | ... | G(x-1,n) |
| x | 36 | G(x,2) | ... | G(x,n) |
| x+1 | 120 | G(x+1,2) | ... | G(x+1,n) |
| x+2 | 140 | G(x+2,2) | ... | G(x+2,n) |
| x+3 | 70 | G(x+3,2) | ... | G(x+3,n) |

FIG. 12E

| | 1 | 2 | ... | n |
|---|---|---|---|---|
| x-1 | 52 | G1(x-1,2) | ... | G1(x-1,n) |
| x | 40 | G1(x,2) | ... | G1(x,n) |
| x+1 | 0 | G1(x+1,2) | ... | G1(x+1,n) |
| x+2 | 40 | G1(x+2,2) | ... | G1(x+2,n) |
| x+3 | 0 | G1(x+3,2) | ... | G1(x+3,n) |

SIMULTANEOUS SELECTION: x, x+2
SIMULTANEOUS SELECTION: x+1, x+3

FIG. 12F

| | 1 | 2 | ... | n |
|---|---|---|---|---|
| x-1 | 32 | G2(x-1,2) | ... | G2(x-1,n) |
| x | 32 | G2(x,2) | ... | G2(x,n) |
| x+1 | 240 | G2(x+1,2) | ... | G2(x+1,n) |
| x+2 | 240 | G2(x+2,2) | ... | G2(x+2,n) |
| x+3 | 140 | G2(x+3,2) | ... | G2(x+3,n) |

SIMULTANEOUS SELECTION: x-1, x+1
SIMULTANEOUS SELECTION: x, x+2

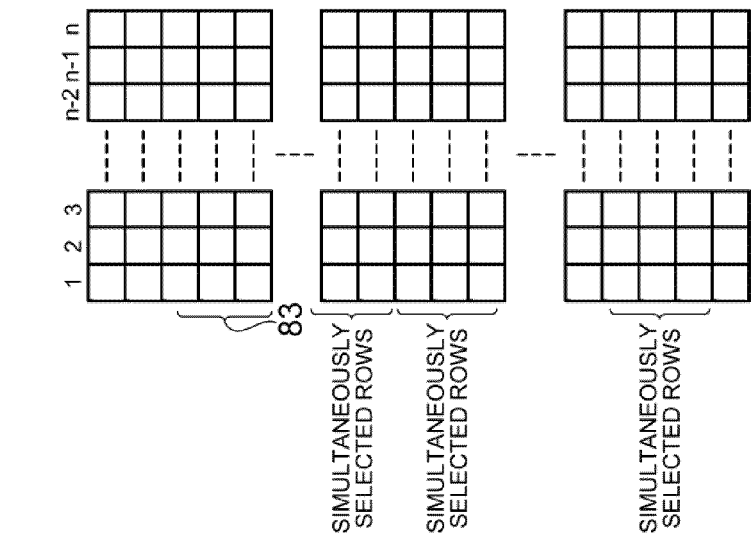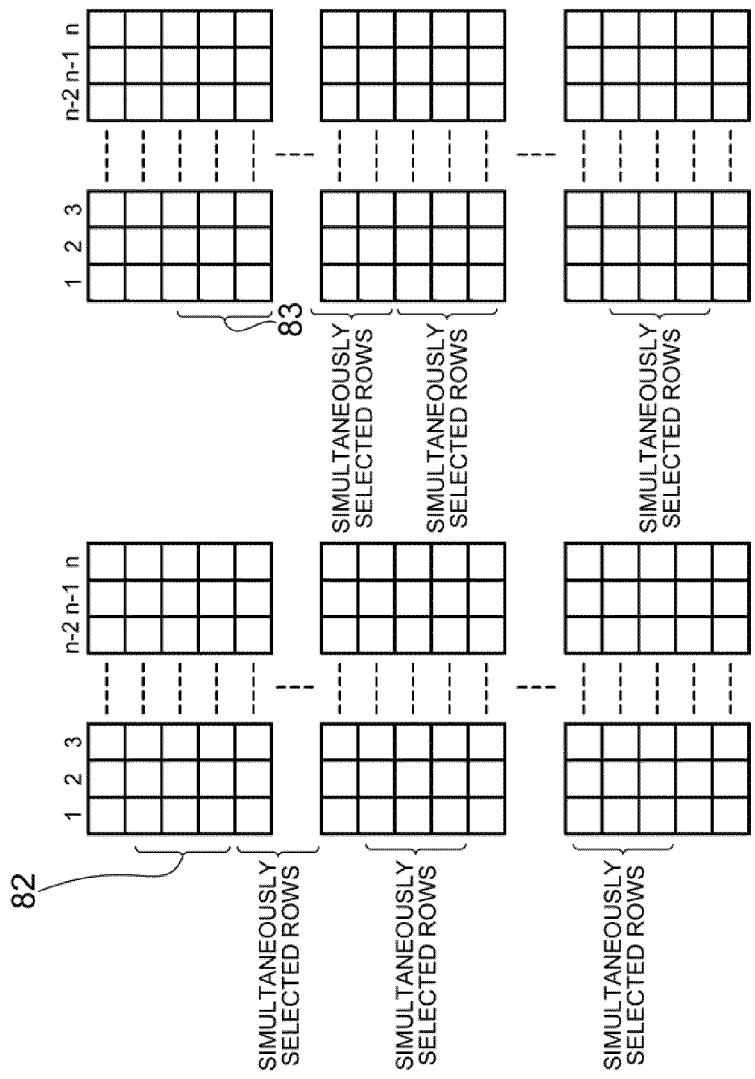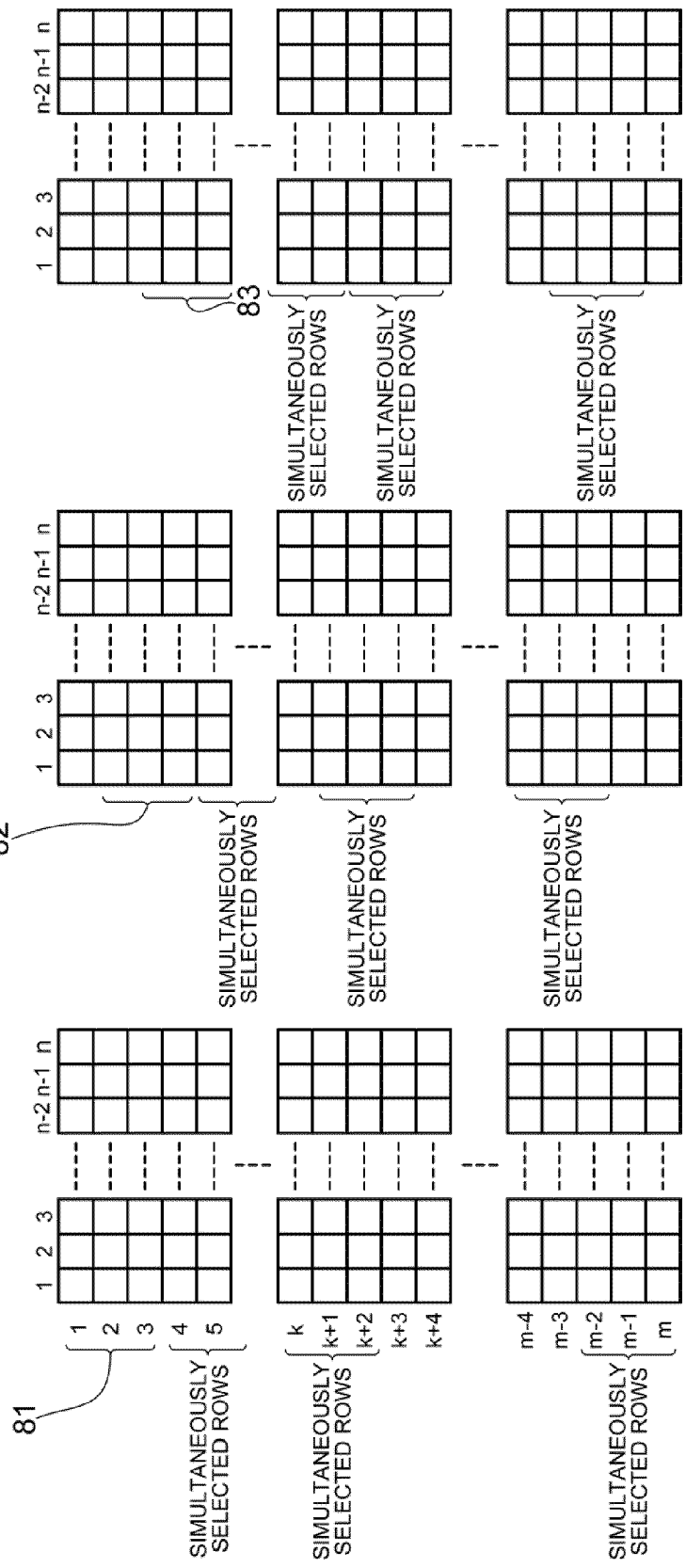

FIG. 14A

| | 1 | 2 | ... | n |
|---|---|---|---|---|
| x−1 | G(x−1,1) | G(x−1,2) | ... | G(x−1,n) |
| x | G(x,1) | G(x,2) | ... | G(x,n) |
| x+1 | G(x+1,1) | G(x+1,2) | ... | G(x+1,n) |
| x+2 | G(x+2,1) | G(x+2,2) | ... | G(x+2,n) |
| x+3 | G(x+3,1) | G(x+3,2) | ... | G(x+3,n) |

FIG. 14B

| | 1 | 2 | ... | n |
|---|---|---|---|---|
| x−1 | 35 | G(x−1,2) | ... | G(x−1,n) |
| x | 31 | G(x,2) | ... | G(x,n) |
| x+1 | 87 | G(x+1,2) | ... | G(x+1,n) |
| x+2 | 120 | G(x+2,2) | ... | G(x+2,n) |
| x+3 | 140 | G(x+3,2) | ... | G(x+3,n) |

FIG. 14C

| | 1 | 2 | ... | n |
|---|---|---|---|---|
| x−1 | 21 | G1(x−1,2) | ... | G1(x−1,n) |
| x | 21 | G1(x,2) | ... | G1(x,n) |
| x+1 | 21 | G1(x+1,2) | ... | G1(x+1,n) |
| x+2 | 120 | G1(x+2,2) | ... | G1(x+2,n) |
| x+3 | 120 | G1(x+3,2) | ... | G1(x+3,n) |

91 — SIMULTANEOUS SELECTION

FIG. 14D

| | 1 | 2 | ... | n |
|---|---|---|---|---|
| x−1 | 52 | G2(x−1,2) | ... | G2(x−1,n) |
| x | 40 | G2(x,2) | ... | G2(x,n) |
| x+1 | 40 | G2(x+1,2) | ... | G2(x+1,n) |
| x+2 | 40 | G2(x+2,2) | ... | G2(x+2,n) |
| x+3 | 100 | G2(x+3,2) | ... | G2(x+3,n) |

| | 1 | 2 | ... | n |
|---|---|---|---|---|
| x−1 | 32 | G3(x−1,2) | ... | G3(x−1,n) |
| x | 32 | G3(x,2) | ... | G3(x,n) |
| x+1 | 200 | G3(x+1,2) | ... | G3(x+1,n) |
| x+2 | 200 | G3(x+2,2) | ... | G3(x+2,n) |
| x+3 | 200 | G3(x+3,2) | ... | G3(x+3,n) |

93 — SIMULTANEOUS SELECTION

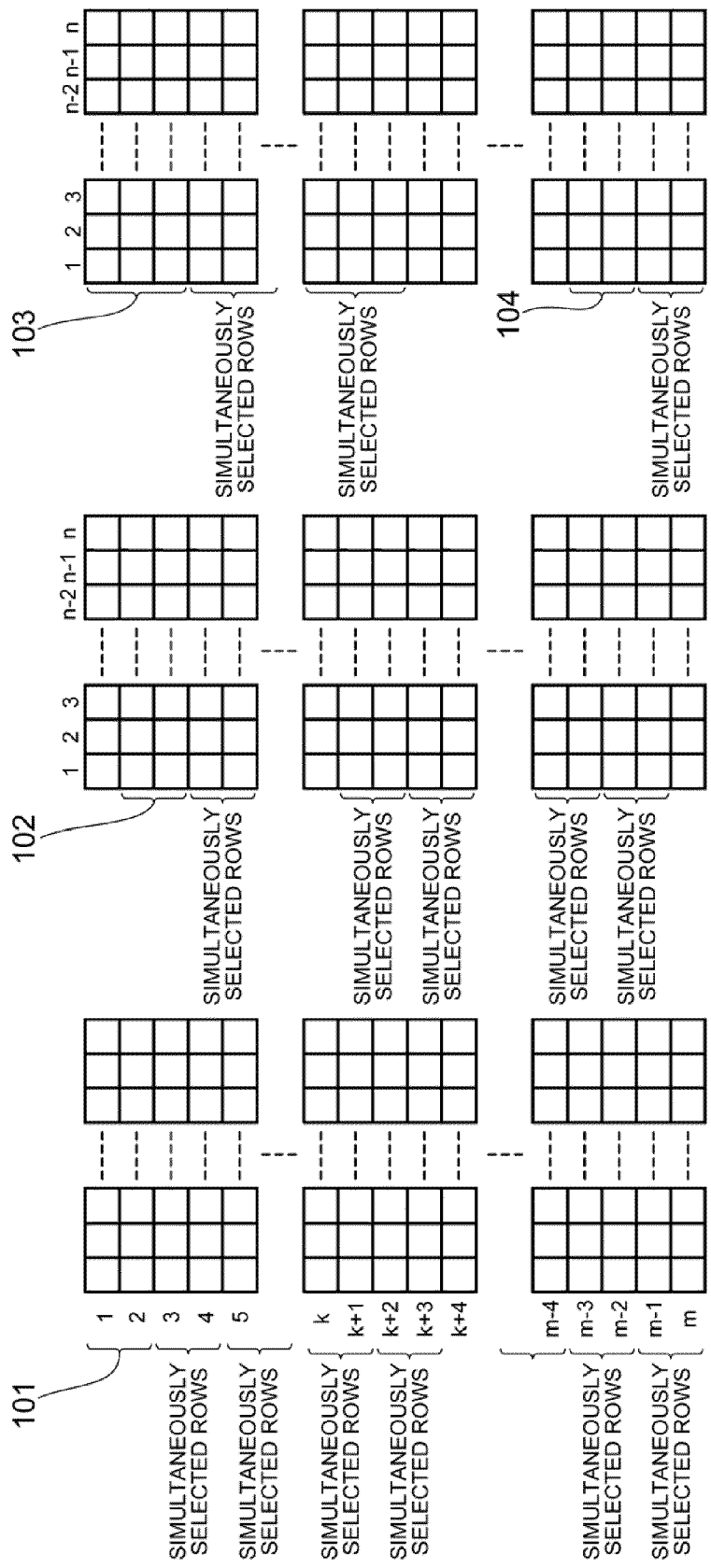

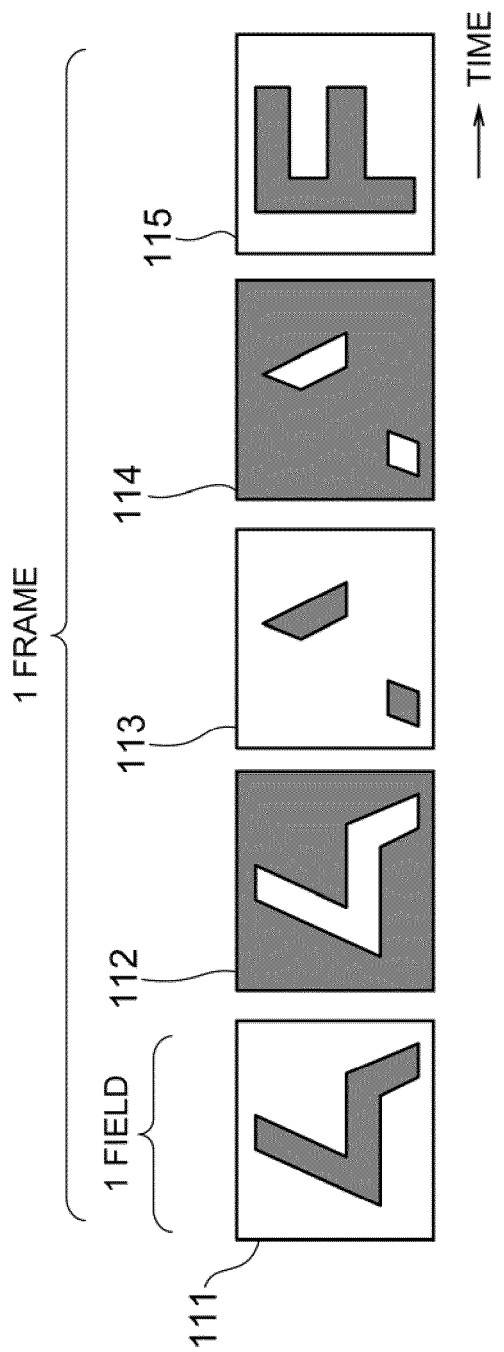

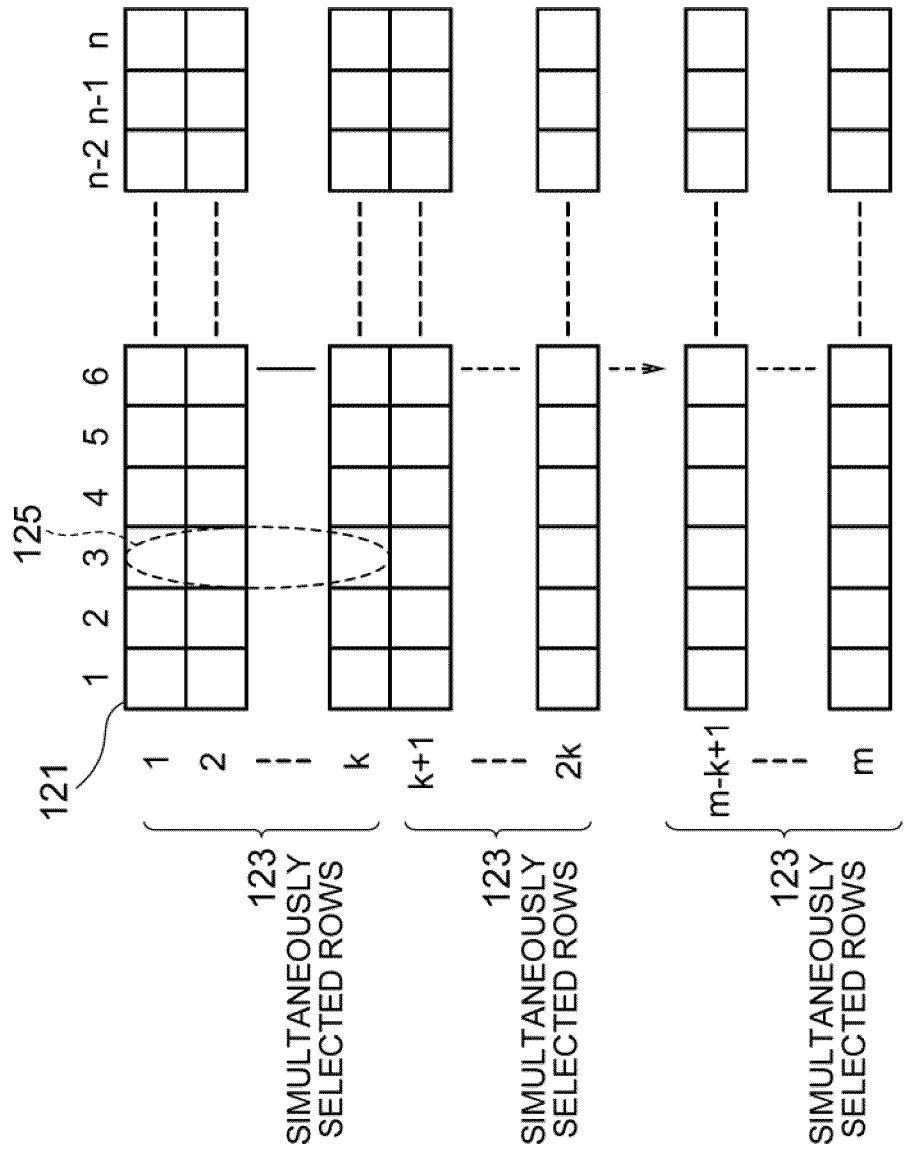

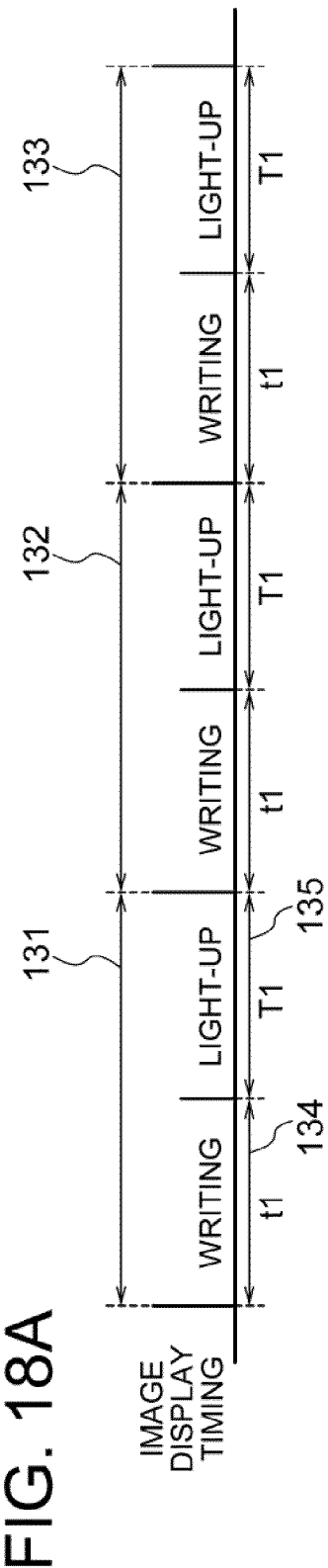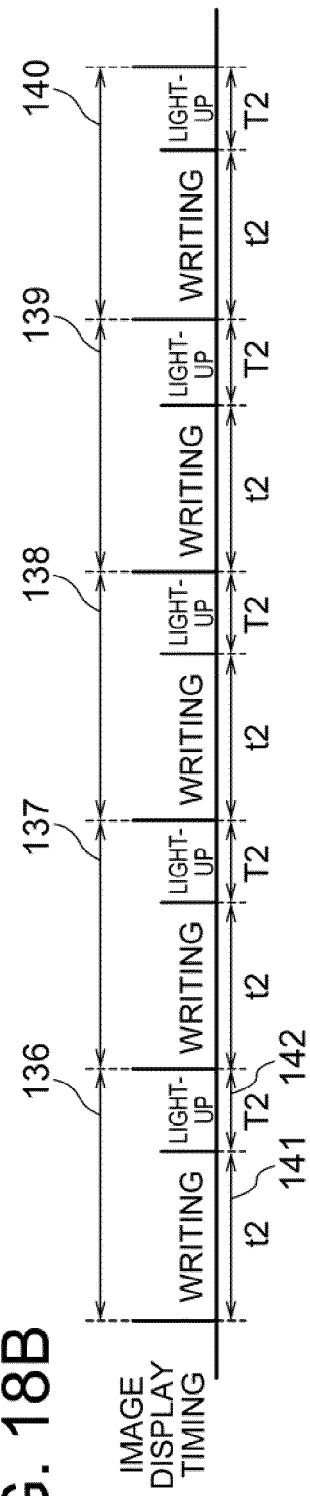

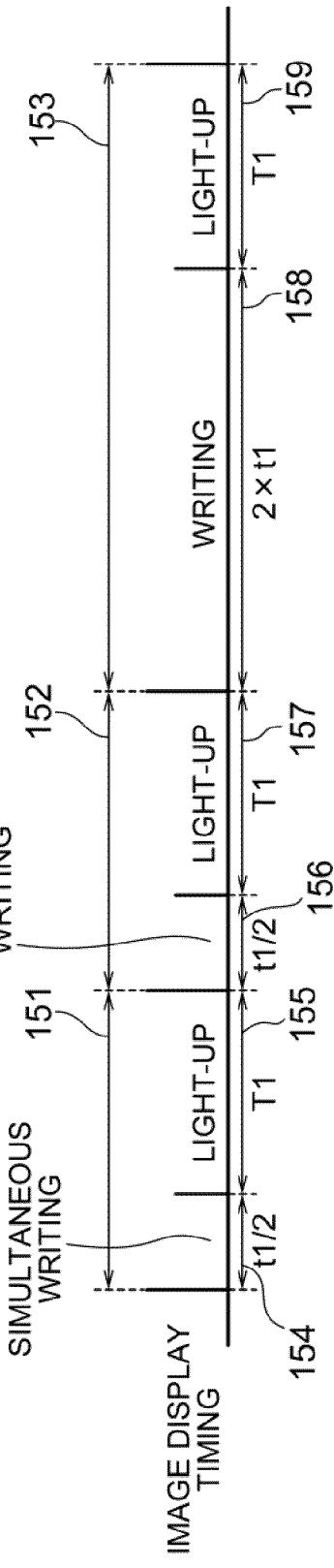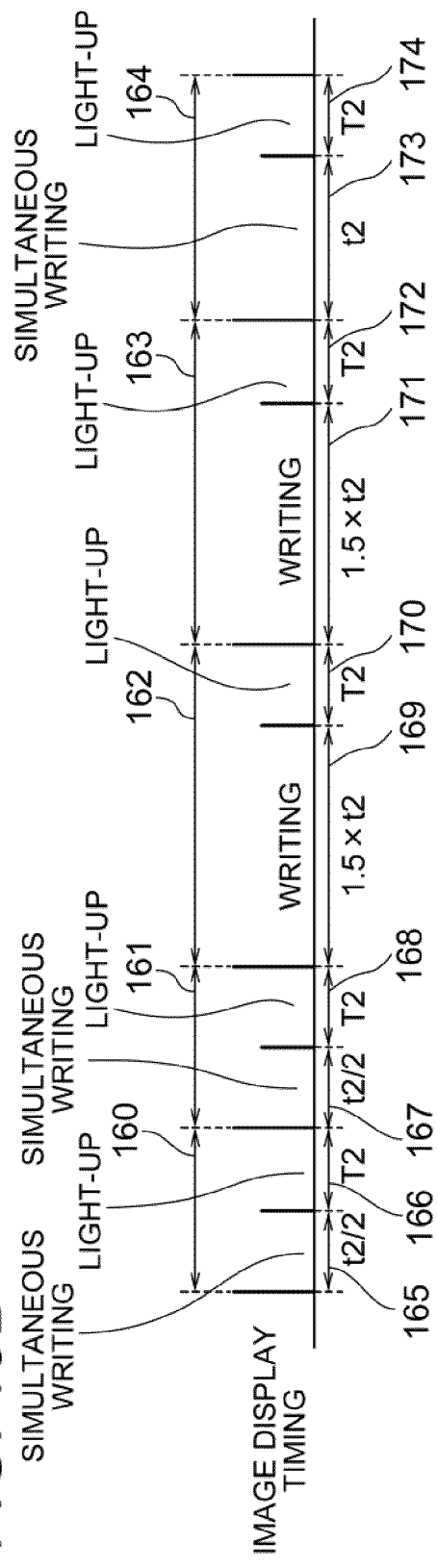

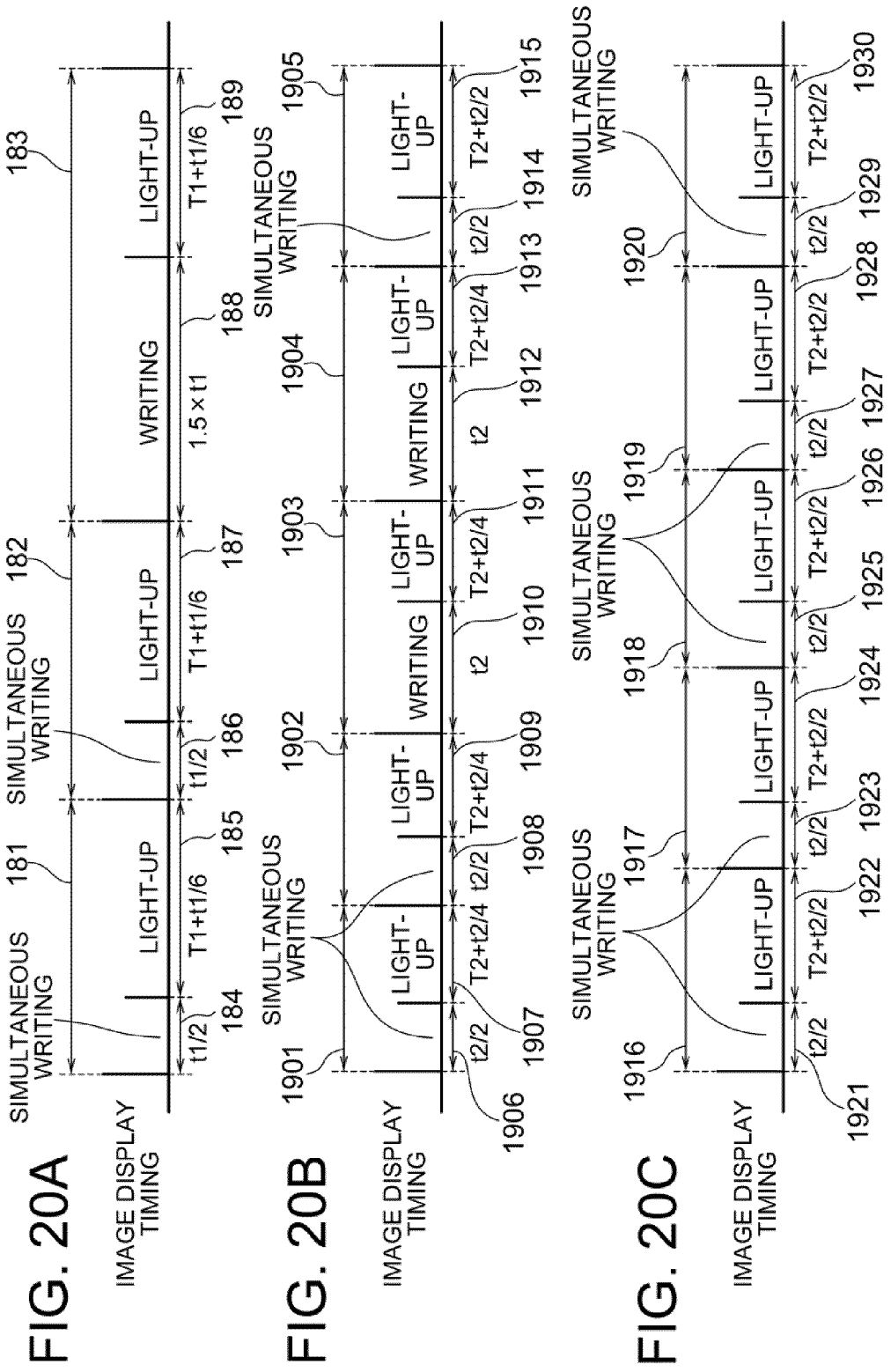

FIG. 25A

| 261 | y | y+1 | y+2 |
|---|---|---|---|
| x | 128 | 64 | 32 |
| x+1 | 100 | 80 | 50 |

SEQUENTIAL SELECTION {y, y+1, y+2}

| 261 | y | y+1 | y+2 |
|---|---|---|---|
| x | 60 | 40 | 20 |
| x+1 | 60 | 40 | 20 |

SIMULTANEOUS SELECTION {x, x+1}

SEQUENTIAL SELECTION {y, y+1, y+2}

| 261 | y | y+1 | y+2 |
|---|---|---|---|
| x | 196 | 216 | 236 |
| x+1 | 196 | 216 | 236 |

SIMULTANEOUS SELECTION {x, x+1}

SEQUENTIAL SELECTION {y, y+1, y+2}

| 261 | y | y+1 | y+2 |
|---|---|---|---|
| x | 196 | 88 | 44 |
| x+1 | 140 | 120 | 80 |

SEQUENTIAL SELECTION {x, x+1}

SEQUENTIAL SELECTION {y, y+1, y+2}

| 261 | y | y+1 | y+2 |
|---|---|---|---|
| x | 60 | 168 | 212 |
| x+1 | 116 | 136 | 176 |

SEQUENTIAL SELECTION {x, x+1}

266

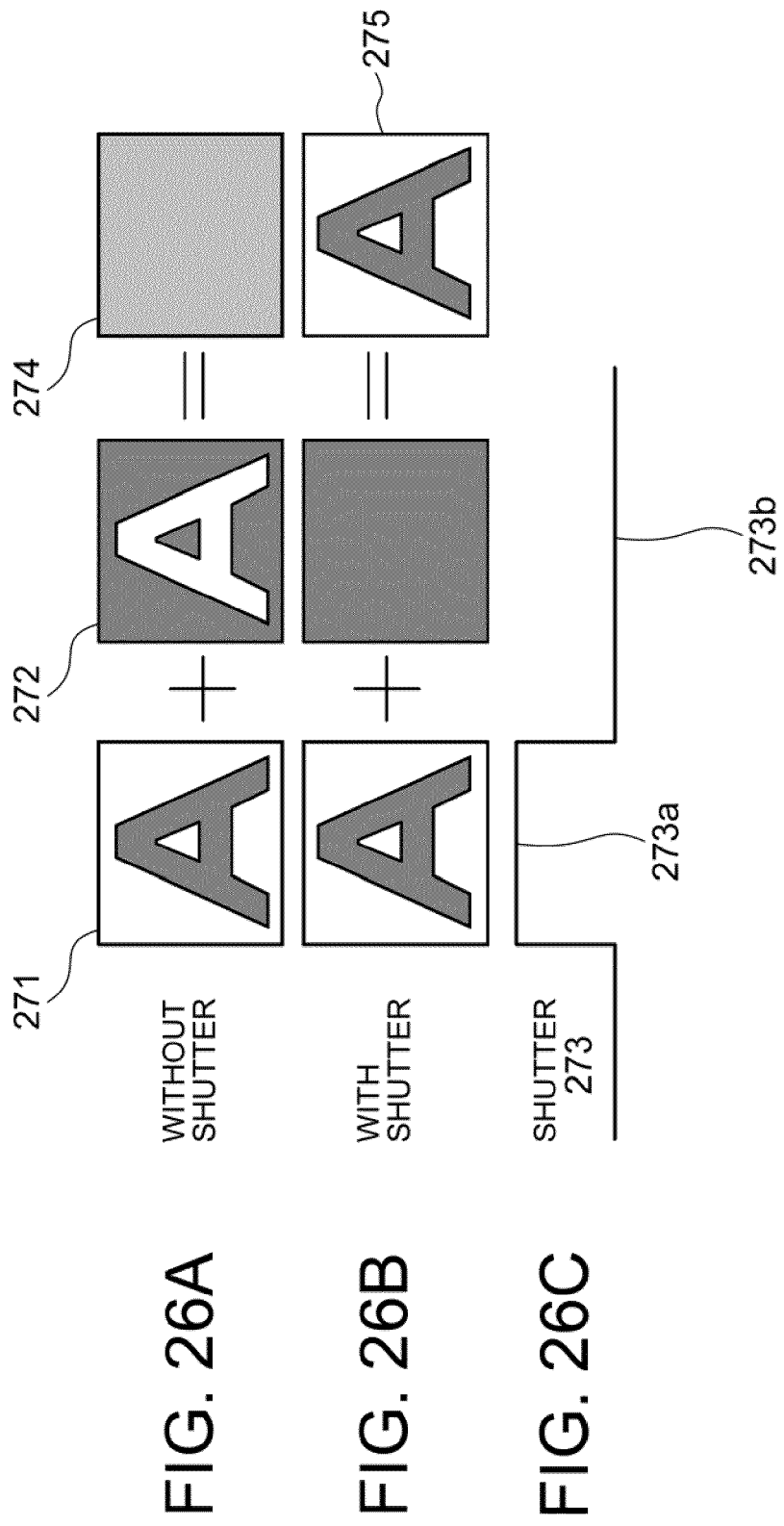

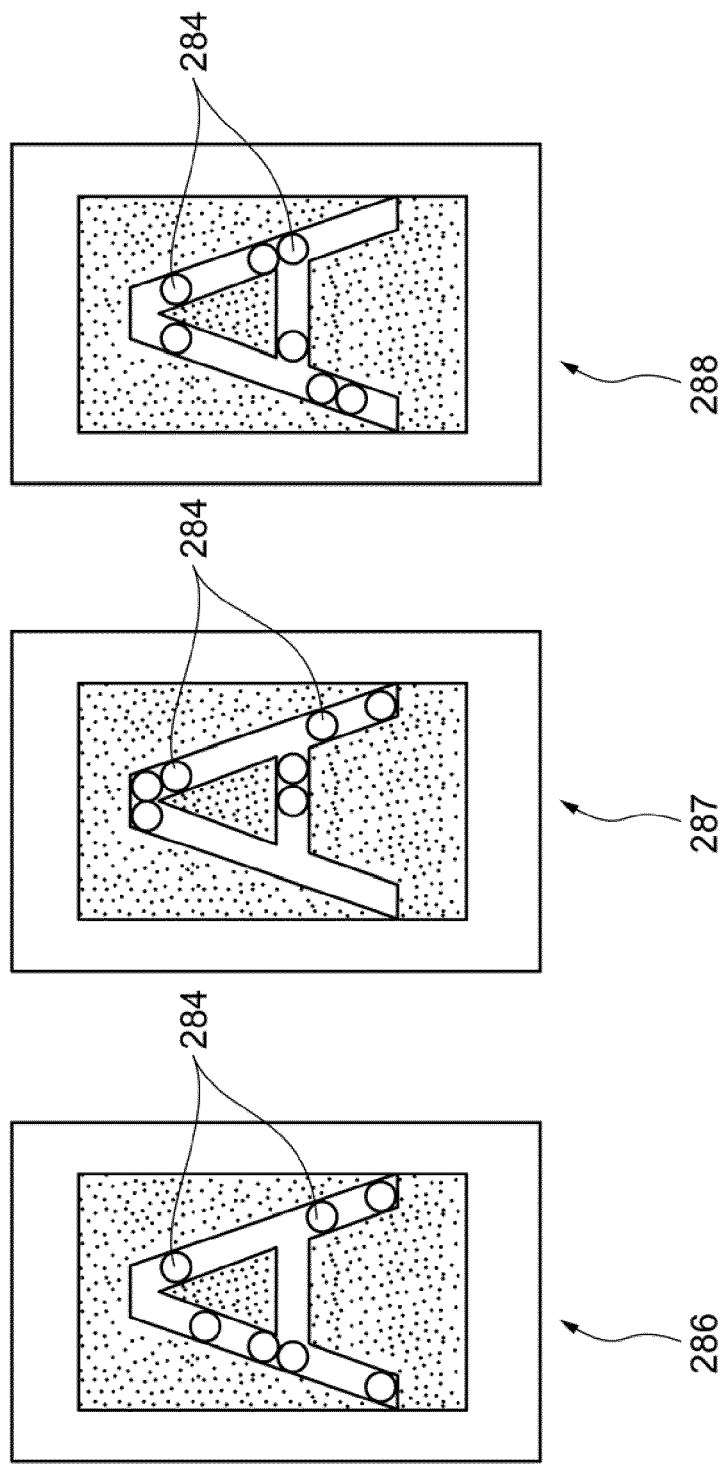

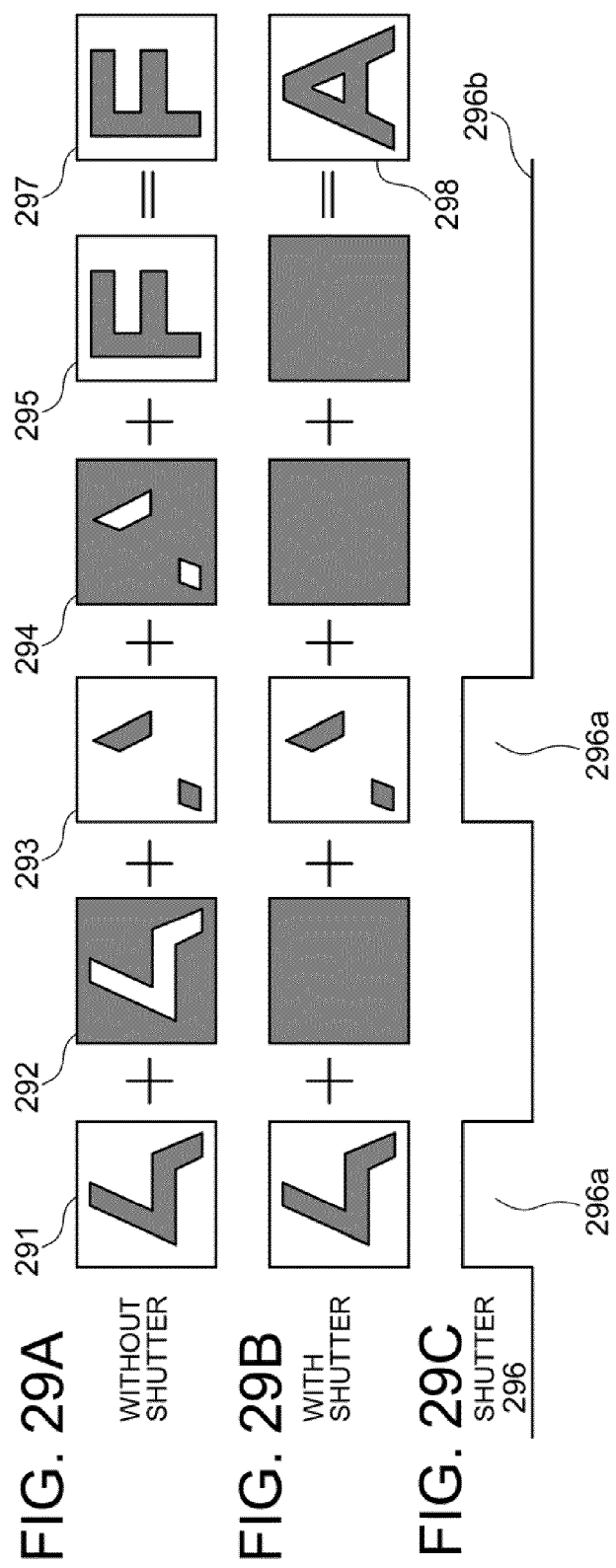

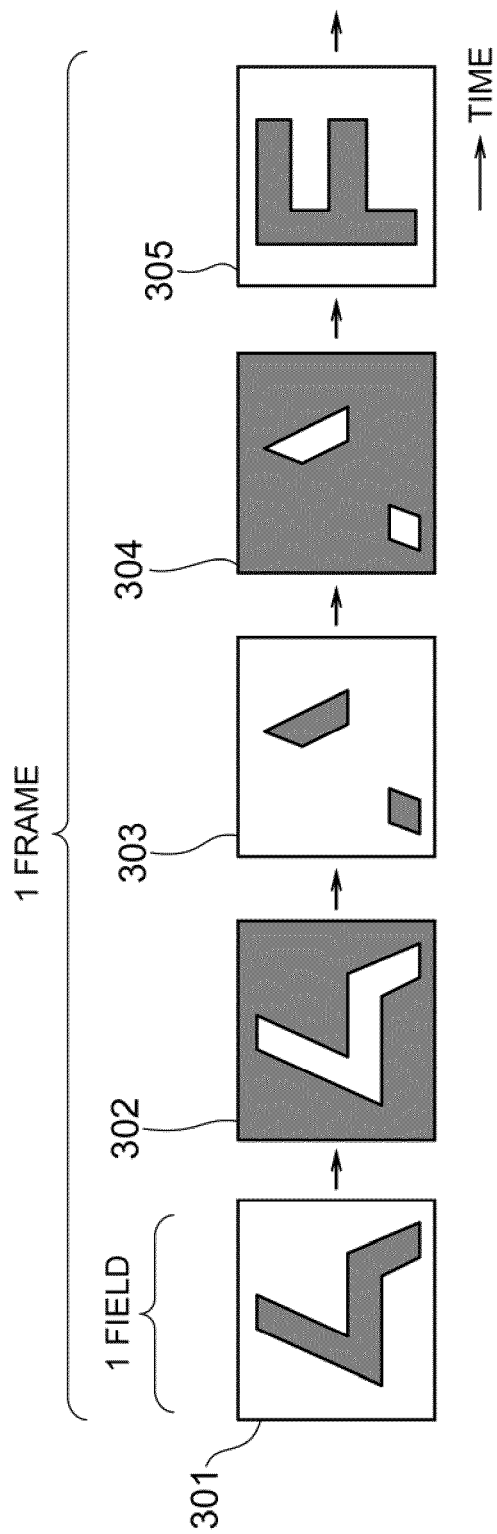

DISPLAY SYSTEM, CONTROL SYSTEM, AND DISPLAY METHOD

This Application is the National Phase of PCT/JP2008/052578, filed Feb. 15, 2008, which claims the Priority right based on Japanese Patent Application No. 2007-035471 filed on Feb. 15, 2007, and the disclosure thereof is hereby incorporated by reference in its entirety.

TECHNICAL FIELD

The present invention relates to a display system, a control system, and a display method. More specifically, the present invention relates to a display system, a control system, and a display method, which display a plurality of images by switching those images at a high speed.

BACKGROUND ART

Currently, portable terminals such as notebook personal computers, personal digital assistances (PDAs), and portable telephones are used daily at places where other people are around, e.g., on vehicles such as trains and airplanes, and various public facilities. It is expected that such trends will accelerate further in the future in accordance with increases in public LAN equipment caused due to developments of a ubiquitous information society. Under such environments, there are issues regarding security and privacy, i.e., displayed contents on the display can be recognized by people around. Further, there is an increasing tendency to enhance protection of confidential information such as establishing the Personal Information Protection Law, and it has been demanded to take measures such as protecting highly confidential information from those who are not entitled to view that information not only when using the portable terminal outside such as in the above cases but also when using desktop devices at workplaces or the like.

As one of the techniques for satisfying such demands, there is known a method which combines display of a plurality of images and an optical shutter that synchronizes with the display, for example (see patent Document 1). This technique will be described by referring to FIG. 26.

The method disclosed in Patent Document 1 uses the optical shutter that synchronizes with display of a plurality of images, with which only specified users can view prescribed images. This enables protection of the information. As shown in FIG. 26, the method switches and displays a secret image 271 that is the image originally desired to be displayed and an image 272 that is an inversed image of the secret image 271. At the same time, as shown in FIG. 26C, the optical shutter 273 used only by the user is turned into a transmission state 273a by synchronizing with the secret image 271, and the optical shutter 273 is turned into a light-shielding state 273b by synchronizing with the inversed image 272.

With this, the displayed image is recognized by the user of the optical shutter as a perceived image that is equivalent to the secret image 271 as in FIG. 26B, and it is recognized by surrounding unspecified people as a halftone (gray) perceived image 274 in which the inversed image 272 is superimposed on the secret image 271 as in FIG. 26A. Even if the halftone perceived image 274 is recognized, it is impossible for the unspecified people to identify the secret image 271 and only the specified person can recognize the secret image 271, since the whole perceived image 274 is gray.

However, with the method disclosed in Patent Document 1, the image to be kept confidential is displayed in an original form. Thus, there may be cases where even unspecified people that do not use the optical shutter can recognize the secret image, when the unspecified people blink their eyes at the moment where the secret image 271 is displayed or when the image is taken by a camera. As one of the techniques for overcoming this issue, there is proposed a secret image dispersive display method (see Patent Document 2).

As shown in FIG. 27, the method disclosed in Patent Document 2 for overcoming the issue pays attention to the fact that a letter "A" that is the secret image to be displayed in the first place (original image) is displayed by a set of a plurality of pixels 284. The method disperses an image into three images 286, 287, and 288 shown in FIG. 28 from which the pixels 284 configuring the letter "A" shown in FIG. 27 are thinned out, inserts a dummy image that is irrelevant to the secret image between the dispersed images 286, 287, and 288, and displays the images while switching those at a high speed.

In Patent Document 2, the three images 286, 287, and 288 from which the pixels 284 are thinned out as well as the dummy image are displayed while being switched at a high speed. At the same time, the timing for displaying those images and the timing for opening/closing the optical shutter are synchronized, and the optical shutter is set to a transmission state only when the dispersed secret images (divided images) are displayed. In this manner, Patent Document 2 utilizes an afterimage effect of human eyes so that only the permitted user can observe the secret images. Further, Patent Document 2 also discloses a technique which can transmit information only to a specific user with secret images, while displaying public images to unspecified people.

It is also considered to apply Patent Document 1 to Patent Document 2. FIG. 29 shows an example of such case. In the example shown in FIG. 29, a letter "A" that is the original image is dispersed into two images 291 and 293, and images 292 and 294 which are inversed images of the images 291 and 293 are inserted respectively to the images 291 and 293. Further, a letter "F" that is a public image 295 is inserted, and those images are displayed on a display while being switched at a high speed. As shown in FIG. 29A, unspecified people who do not use the shutter 296 recognize the letter "F" to which the images 291-295 are added as a perceived image 297. In the meantime, as shown in FIG. 29C, the specified person uses the shutter 296. Thus, by controlling the shutter 296 to be in the transmission state 296a when the divided images 291 and 293 are displayed and to be in the light-shielding state 296b when displaying the inversed images 292, 294 and the public image 295, the specified user can recognize the letter "A" to which the divided images 291 and 293 are added as the perceived image 298 as in FIG. 29B.

In the example shown in FIG. 29, even if the unspecified people perceive the divided image 291 or the divided image 294 by blinking or taking it by a camera, such image alone does not makes any sense. Thus, the confidentiality can be improved further. Patent Document 3 also proposes a method which divides original image data to N pieces (N≥2) of image data in order to prevent unlawful copy of the image data.

Patent Document 1: Japanese Unexamined Patent Publication 6-110403

Patent Document 2: Japanese Unexamined Patent Document 2001-255844

Patent Document 3: Japanese Patent No. 3577455

However, there are issues in the above-described methods disclosed in Patent Document 2 or Patent Document 3. Such issues will be described by referring to FIG. 30 which shows only the image displayed on the display taken out from FIG. 29.

In FIG. 30, it is assumed that the images are displayed in order of arrows, a series of two or more images (from a divided image 301 to a public image 305) are together called a frame, and repeated frequency is a frame frequency. Further, each image configuring the frame is called a field.

An image obtained by synthesizing the divided image 301 and the inversed image 302, and an image obtained by synthesizing the divided image 303 and the inversed image 304 are recognized as a halftone gray image, respectively. Further, in order for the image obtained by synthesizing the divided image 301 and the divided image 303 to be recognized as the perceived image 298 shown in FIG. 29, it is necessary to shorten the period from a writing start point of a certain image to a writing start point of a next image (i.e., a field cycle) when displaying images from the divided image 301 to the inversed image 304. Specifically, it is necessary to set the frame cycle to be short to be within a period where the afterimage effect of human eyes works or within a period where no flicker is generated.

In a liquid crystal display used in a PC (personal computer), normally, "1 frame=1 field" and the frame frequency is 60 Hz. If the number of fields is increased as in FIG. 30 while keeping the frame frequency as 60 Hz, the frequency per field becomes 300 Hz that is five times as that of the normal display provided that the display cycle of each field is the same. The driving frequency of the pixels also increases accordingly. Thus, when normal line sequential driving is executed on a display with resolution of XGA, the driving frequency of 200 MHz-300 MHz is required as the driving frequency of a data driver. For preventing the image from being mixed into a next image when viewing the images by using the optical shutter, if a part of the field cycle is used for writing and a backlight is lighted up at the point where the writing is ended, for example, the driving frequency becomes still higher.

FIG. 30 shows the example in which the secret image is dispersed into two. When the number of dispersed images is increased, naturally the frequency is increased further. Driving with such high frequency induces an increase of the power consumption. The driving frequency can be lowered by expanding the writing period. However, in that case, if the field cycles are fixed, the light-up period of the backlight becomes shortened. This results in causing an issue of deteriorating the brightness.

Even if a dot clock is simply increased for shortening the writing period further, the writing period cannot be shortened. Signal input time for the pixels is rate-determined with the data line wiring delay at the time of normal signal input, so that it is difficult to achieve driving with high frequency.

In the case of Patent Document 3, the driving frequency is also increased at least twice as that of the normal display due to dividing of the image or increased to several times more depending on the number of divisions. Therefore, Patent Document 3 has the same issues in terms of the fact that the power consumption is increased and the driving becomes difficult.

It is an object of the present invention to provide a display system and a display method, which can display images brightly by decreasing or without increasing the driving frequency of a controller and a driver which controls the display in a display system which switches and displays a plurality of images at a high speed.

DISCLOSURE OF THE INVENTION

In order to achieve the forgoing object, the display system according to the present invention is a display system which sequentially displays two or more types of images on a display screen by writing image data while scanning pixels on the display screen. The display system includes: a controller which simultaneously selects two or more pixels of the display screen for a specific image among the two or more types of images, writes a same image data to the two or more selected pixels to display the specific image, individually selects the pixels of the display screen for images other than the specific image, and individually writes an image data to the individually selected pixels to display the images other than the specific image so as to control display of those images.

While the present invention described above is built as the display system as the whole structure, the present invention is not limited only to that. The present invention may be built, as a display method or a control system which executes controls for sequentially displaying two or more types of images on an existing display screen by being applied to the existing display screen or the like.

The control system according to the present invention is a control system which sequentially displays two or more types of images on a display screen by writing image data while scanning pixels on the display screen of the display system. The control system includes: a controller which simultaneously selects two or more pixels of the display screen for a specific image among the two or more types of images, simultaneously writes a same image data to the two or more selected pixels to display the specific image, individually selects the pixels of the display screen for images other than the specific image, and writes an image data to the individually selected pixels to display the images other than the specific image so as to sequentially display those images on the display screen.

The display method according to the present invention is a display method which sequentially displays two or more types of images on a display screen by writing image data while scanning pixels on the display screen. The display method includes: simultaneously selecting two or more pixels of the display screen for a specific image among the two or more types of images; writing a same image data to the two or more selected pixels to display the specific image; individually selecting the pixels of the display screen for images other than the specific image; and writing an image data to the individually selected pixels to display the images other than the specific image so as to sequentially display of those images on the display screen.

The present invention can brighten the images by decreasing or without increasing the driving frequency of a controller and a driver which control the display when displaying a plurality of images while switching those at a high speed.

BEST MODES FOR CARRYING OUT THE INVENTION

Next, exemplary embodiments of the invention will be described in detail by referring to the drawings.

As shown in FIG. 1 and FIG. 3, a display system according to the exemplary embodiments of the invention is a display system which sequentially displays two or more types of images on a display screen 1 by writing image data through scanning pixels on the display screen 1. The display system has a controller 10 which: simultaneously selects two or more pixels on the display screen for a specific image among the two or more types of images; simultaneously writes same image data to the two or more types of selected pixels to display the specific image; individually selects the pixels on the display screen for the images other than the specific image; and writes image data to the individually selected pixels to display the images other than the specific image for controlling display of those images.

A plurality of pixels on the display screen 1 are arranged in matrix or in a form conforming to that. As the layout of the pixels conforming to the matrix may be a case where neighboring pixels are disposed in an alternate manner, for example. The point is that any forms can be employed in terms of the layout of the plurality of pixels on the display screen 1, as long as it is the layout which is capable of displaying visible images such as letters and pictures by combining image data that are respectively written to the pixels arranged neighboring to each other.

Further, the pixels of the display screen 1 are not limited to pixel electrode parts of liquid crystal panel, an organic EL panel, and the like or spatially limited type such as phosphor parts of a CRT. The pixels also includes laser-beam projected part such as a laser projector. Described herein is a case where the pixels of the display screen 1 are the phosphor parts of the CRT or the laser-beam projected parts of the laser projector, for example, as shown in FIG. 3C. In the case of the CRT, an electron beam emitted from an electron gun is irradiated to the phosphor part to write the image data to the pixels by having the irradiated position as a unit, while scanning the phosphor part in the horizontal direction with the electron beam. At the same time, the scanning start position is shifted in the vertical direction, and the scanning operation of the phosphor part in the horizontal direction is repeatedly executed to operate a plurality of pixels sequentially, i.e., an effective display area of the phosphor part is scanned with the electron beam to display images on the phosphor part. This image display can be done in a similar method, when a plurality of pixels on the display screen 1 correspond to the laser-beam projected part of the laser projector.

Further, there is described a case where the plurality of pixels of the display screen 1 are the pixel electrode parts of a liquid crystal panel or an organic EL panel, for example. The pixel electrode parts of the liquid crystal panel and the organic EL panel, for example, are normally arranged in matrix. A case of the pixel electrode parts of the liquid crystal panel will be described in particular. When the display screen 1 is the liquid crystal panel, as shown in FIG. 4, a plurality of scan lines 7 extending in the lateral direction are arranged in the longitudinal direction on the display screen 1 at a specific interval, a plurality of data lines 8 extending in the longitudinal direction are arranged in the lateral direction at a specific interval, and a pixel 9 is provided, respectively, by corresponding to each intersection point between the scan line 7 and the data line 8. Further, a scan line drive circuit 2 for supplying scanning signals to the plurality of scan lines 7 and a data line drive circuit 3 for inputting image data (electric signals) to the plurality of data lines 8 are provided. On the display screen 1, a scanning signal is supplied to the scan line 7(1) on the uppermost stage (uppermost row) and image data is inputted from the data line drive circuit 3 to each data line 8 from the leftmost column (1) to the rightmost column (m) to write the image data to a plurality of pixels from (1, 1) to (1, m) which are provided at the intersections between the scan line 7(1) of the uppermost row (1) and the plurality of data lines 8. Then, the scanning start position is shifted from the scan line 7 of uppermost row (1) to a next row (2) by a scanning signal outputted from the scan line drive circuit 2, and image data is written to a plurality of pixels from (2, 1) to (2, m) which are provided at the intersections between the scan line 7(2) on the row (2) and a plurality of data lines 8. Through conducting the above-described operation by shifting the scan lines 7 from the uppermost row (1) to the lowermost row (n), the image of one frame can be displayed on the effective display plane of the liquid crystal panel. A plurality of images are displayed sequentially on the display screen 1 through repeating such operations. Operations of the liquid crystal panel as the display screen 1 are executed in the same manner also with the organic EL panel.

Further, when the scan line drive circuit 2 and the data line drive circuit 3 are provided, the controller 10 according to the exemplary embodiments of the invention controls driving of the scan line drive circuit 2 and the data-line drive circuit 3 to simultaneously select two or more scan lines 7(31) from the plurality of scan lines 7 for a specific image out of the two or more types of images, simultaneously writes image data to the two or more pixels 9 corresponding to the two or more selected scan lines 7(31) to display the specific image, individually selects the scan line 7 from the plurality of scan lines for the images other than the specific image, individually writes the image data to the pixel 9 corresponding to the individually selected scan line 7 to display the images other than the specific image, and displays those images sequentially on the display screen.

Note here that "to simultaneously select two or more pixels on the display screen for each image displayed on the display screen 1" in the exemplary embodiment of the invention means "to simultaneously select two or more scan lines 7 among the plurality of scan lines 7 according to the scan signals supplied from the scan line drive circuit 2" when the scan line drive circuit 2 and the data-line drive circuit 3 are provided. Referring to the drawing, "to select two or more scan lines 7" means "to radiate two electron beams or two laser beams 18 simultaneously at two points on a projection panel 12" as shown in FIG. 3C and FIG. 3D, or means "to select k-number of scan lines (7)31" as in FIG. 5.

Further, "to simultaneously write same image data to the two or more selected pixels" in the exemplary embodiment of the invention means "to write image data to two or more pixels 9 which are scanned simultaneously by supplying the scan signal to the two or more simultaneously selected scan lines 7(31) from the scan line drive circuit 2" when the scan line drive circuit 2 and the data-line drive circuit 3 are provided. Referring to the drawing, "to write the image data to the two or more simultaneously selected pixels 9" means "to have two electron beams or two laser beams 18 synchronized with each other to write the image data at the irradiated positions thereof" as shown in FIG. 3C and FIG. 3D, or means "to write the image data to k-number of pixels 9 provided at the intersections between the k-number of simultaneously selected scan lines (7)31 and the data lines 8" as in FIG. 5.

While the above-described exemplary embodiment is built as the display system including the display screen 1 and the controller 10, the present invention is not limited only to such case. As long as there already exists the display screen 1, the controller 10 mounted into the display screen 1 may be built as a control system which controls display of two or more types of images sequentially on the display screen by writing the image data while scanning the pixels on the display screen. Further, the controller 10 of the control system may be built as a structure described below.

Next, operations of the controller 10 when sequentially displaying two or more types of images on the display screen 1 according to the exemplary embodiment of the invention will be described by referring to the drawings.

Described by referring to FIG. 2 is a case where an original image and two types of divided images 302 and 303 which are obtained by dividing the original image into two images shown in FIG. 30 are used as the two or more types of images displayed sequentially.

First, as shown in FIG. 2, the controller 10 inputs an original image to be displayed (step S1), and divides the original image to a plurality of divided images 301 and 303 (step S2).

At this time, the controller 10 considers the dividing number of the image and the pixel areas that are selected simultaneously, and makes adjustments in such a manner that the averages thereof in the divided images 301 and 303 become equivalent to those of the original image. This will be described later.

Then, when displaying the divided images 301 and 303 on the display screen 1 in a prescribed order (step S3), the controller 10 in the exemplary embodiment of the invention simultaneously selects two or more pixels of the display screen 1 for at least one of the divided images 301 and 303, and supplies a same signal to the two or more simultaneously selected pixels to write the image data to each pixel. The controller 10 conducts this operation to all the pixels on the display screen 1 to display the divided images 301 and 303 sequentially on the display screen 1. Further, as shown in FIG. 2, when the divided images are 1–N pieces of images that are two or more pieces, the controller 10 simultaneously selects two or more pixels for at least one of the divided images, and writes the image data to the two or more simultaneously selected pixels. The number of pixels that are selected simultaneously may be different for each of the divided images.

FIG. 2 shows the case which displays only the two or more divided images that are obtained by dividing the original image. However, it is also possible to insert a random image that is irrelevant to the original image and the divided images between the divided images that are to be displayed one after another (displayed successively), and display those images sequentially. It is also possible to superimpose an inversed image on the respective divided image, which can provide uniform brightness (halftone, for example) by being superimposed on the divided image or to add a public image that is irrelevant to the original image, and display those images sequentially.

The case of displaying the two or more images sequentially on the display screen 1 will be described more specifically by referring to the drawings.

There is described a case which uses the phosphor part of a CRT or a projected part of a laser projector as the pixels of the display screen 1. Hereinafter, the display screen 1 is expressed as a projection panel 12, including the phosphor part and the projected part.

As shown in FIG. 3A, normally, when a single electron beam or a laser beam (hereinafter, generally called laser beam) 14 is emitted from an irradiation part 11 with an intensity corresponding to image data to have the laser beam 184 radiated as a spot on the projection panel 12, an irradiated position 15 emits light. The laser beam 18 is scanned and the irradiated position 15 is shifted along a single scan line 16 as shown in FIG. 3B. After scanning the single scan line 16, a next scan line 16 is scanned in the same manner to display an image. This operation is repeated to display two or more images sequentially.

In the exemplary embodiment of the invention, as shown in FIG. 3C, two laser beams 18 are emitted from an radiation part 17, and those laser beams 18 are simultaneously radiated to the projection panel 12. The projection panel 12 emits light at the irradiated positions of the laser beams 18, and the light-emitting positions form the pixels on the display screen 1. Therefore, in the case of FIG. 3C, two pixels on the projection panel 12, i.e., two irradiated positions 15a and 15b, are selected simultaneously through radiating two laser beams 18 to the two points of the projection panel 12 so as to have the simultaneously selected two irradiated positions 15a and 15b of the projection panel 12 emit the light. The above-described scanning is conducted sequentially along the scan lines 16b and 16b as shown in FIG. 3D. At the point where scanning along the two scan lines 16a and 16b is completed, the two pixels 15a and 15b along the next two scan lines 16a and 16b are simultaneously selected as in a dotted-line arrow so as to have the projection panel 12 at the simultaneously selected pixels 15a and 15b emit the light to display an image. This operation is repeated to display the two or more images sequentially.

Next, described is a case of using the pixel electrode parts of a liquid crystal panel and an organic EL panel, for example, as the pixels of the display screen 1. A case of the liquid crystal panel will be described in particular.

As shown in FIG. 4, in the liquid crystal panel, n-number of scan lines 7 and m-number of data lines 8 are arranged by crossing with each other on the display screen 1, and the pixel 9 is provided by corresponding to each intersection thereof. Image data is written to the pixels 9 under controls of the scan line drive circuit 2 which drives a plurality scan lines 7 and the data line drive circuit 3 which drives a plurality of data lines 8.

As shown in FIG. 5, scanning signals are outputted to the scan lines 7 from the scan line drive circuit 2 to select k-number of scan lines 31 simultaneously, and the same image data is written to k-number of pixels 32 simultaneously.

With the exemplary embodiment of the invention as described above, two or more pixels on the display screen are selected simultaneously for at least a single image, and the image data is simultaneously written to the two or more selected pixels. Thus, when a plurality of images are switched at a high speed for display, the driving frequency of the controller and the driver for controlling the display can be decreased. As a result, the image can be brightened without increasing the driving frequency.

Next, the exemplary embodiments of the invention will be described in details by referring to concretive examples.

First Exemplary Embodiment

A case of using the pixel electrode parts of a liquid crystal panel and an organic EL panel, for example, as the pixels of the display screen of the exemplary embodiments of the invention will be described as a first exemplary embodiment of the invention. A case of the liquid crystal panel will be described in particular.

As shown in FIG. 1, a display system. 5 according to the first exemplary embodiment of the invention has a display screen 1 configured with a plurality of pixels that are arranged in matrix or in a form conforming to that, and a controller 10 which controls sequentially repeated display of two or more types of images. An optical shutter 6 that is opened and closed by synchronizing with the display of images is provided as necessary. The optical shutter 6 is drive-controlled by the controller 10.

As shown in FIG. 4, the pixels of the display screen 1 shown in FIG. 1 are provided by corresponding to each of the intersections between n-number of scan lines 7 and m-number of data lines 8. Image data is written to the pixels 9 under controls of the scan line drive circuit 2 which drives a plurality scan lines 7 and the data-line drive circuit 3 which drives a plurality of data lines 8. With the first exemplary embodiment of the invention, as shown in FIG. 5, scanning signals outputted from the scan line drive circuit 2 are supplied to the scan lines 7 to select k-number of scan lines 31 simultaneously and k-number of pixels 32 simultaneously. Note that "k" is an integer of 2 or larger. A pixel provided at the intersection between the i-th scan line 7 and the j-th data line 8 is expressed as (i, j).

The controller 10 has: a secret image division display unit 401 which outputs an instruction to divide a secret image (original image) that can be recognized only by a specific person and displays the image as divided images; a plural scan lines simultaneously selection unit 402 which outputs an instruction for selecting two or more scan lines 7 simultaneously for displaying the divided image; an individual scan line selection unit 403 which outputs an instruction for individually selecting the scanning line 7 when displaying other divided images; and an inversed image display unit 404 which outputs an instruction for making and displaying an inversed image that is superimposed on each divided image to provide images of uniform brightness. Further, when necessary, the controller 10 has an optical shutter control unit 405 which outputs an instruction for controlling the opening/closing timing of the optical shutter by corresponding to the display of the images. Furthermore, when it employs a method which switches an image display modes of the display screen 1, the controller 10 has a mode switching unit 406 for selecting the mode of the image.

When starting to display the images in the first exemplary embodiment of the invention, the controller 10 receives an input of a secret original image (original image) to be displayed (step S101 of FIG. 6), and divides the original image into a plurality of divided images. The controller 10 conducts calculation in such a manner that the average of the luminance of the divided images becomes equivalent to that of the original secret image by considering the number of divided images, the pixel areas selected simultaneously, and the like, and makes the divided images by allotting the calculated luminance to the divided images (step S102 of FIG. 6).

Next, for each of the divided images, the controller 10 makes the inversed image with which synthesized images obtained when superimposed on the respective images can be in uniform brightness (halftone gray screen, for example) (step S103 of FIG. 6). The controller 10 sequentially and continuously displays the divided images and the inversed images on the display screen 1 under controls of the scan line drive circuit 2 and the data line drive circuit 3.

When displaying the divided images and the inversed images, the controller 10 specifies the image for which simultaneously selects two or more scan lines 7 from a plurality of scan lines 7 to select two or more pixels 9 under controls of the scan line drive circuit 2 (step S104 of FIG. 6), writes the same image data with the data line drive circuit 3 to the two or more simultaneously selected pixels 9, and displays the image with the luminance calculated in step S102 (step S105 of FIG. 6).

Further, when displaying the images other than the divided images specified in advance and the inversed images thereof, the controller 10 displays images with the luminance calculated in step S102 through selecting each pixel 9 by selecting the plurality of scan lines 7 with a normal method, i.e., by selecting the scan lines 7 one by one, under controls of the scan line drive circuit 2 (step S106 of FIG. 6).

As described above, when displaying the specified divided images and the inversed images, the controller 10 simultaneously selects two or more scan lines 7 from the plurality of scan lines 7 to select two or more pixels 9 simultaneously, and writes the same image data to the two or more simultaneously selected pixels 9. When displaying the images other than those images, the controller 10 individually selects each pixel 9 by selecting a single scan line 7 from the plurality of scan lines 7, and simultaneously writes the image data to each of the individually selected pixels 9. With this, the controller 10 sequentially displays the divided images related to the original image and the inversed images as well as the other images on the display screen 1.

Upon completing the above-described processing, the controller 10 judges whether or not all the divided images and the inversed images thereof have been displayed (step S107 of FIG. 6). When displays of the divided images have not been completed, the procedure returns to step S104. When the displays of the divided images have been completed, the procedure returns to step S101 and the controller 10 fetches a next original image.

While FIG. 6 shows the case of displaying the divided images and the inversed images thereof, it is also possible to insert a random image that is irrelevant to the original image or the divided images between the divided images or to add a public image that is irrelevant to the original image at the start or the end of one frame.

Second Exemplary Embodiment

Next, a case of using the phosphor part of a CRT or a projected part of a laser projector as the pixels of the display screen 1 according to the exemplary embodiment of the invention will be described as a second exemplary embodiment of the invention. Hereinafter, the display screen 1 is expressed as a projection panel 12, including the phosphor part and the projected part.

As shown in FIG. 3A, normally, when a single electron beam or a laser beam (hereinafter, generally called laser beam) 14 is emitted from an radiation part 11 with an intensity corresponding to image data to have the laser beam 18 radiated as a spot on the projection panel 12, an irradiated position 15 emits light. The laser beam 18 is scanned and the irradiated position 15 is shifted along a single scan line 16 as shown in FIG. 3B. After scanning the single scan line 16, a next scan line 16 is scanned in the same manner to display an image. This operation is repeated to display two or more images sequentially.

In the second exemplary embodiment of the invention, as shown in FIG. 3C, two laser beams 18 are emitted from a radiation part 17, and those laser beams 18 are simultaneously radiated to the projection panel 12. The projection panel 12 emits light at the irradiated positions of the laser beams 18, and the light-emitting positions form the pixels on the display screen 1. Therefore, in the case of FIG. 3C, two pixels on the projection panel 12, i.e., two irradiated positions 15a and 15b, are selected simultaneously through radiating two laser beams 18 to the two points of the projection panel 12 so as to have the simultaneously selected two irradiated positions 15a and 15b of the projection panel emit the light. The above-described scanning is conducted sequentially along the scan lines 16a and 16b as shown in FIG. 3D. At the point where scanning along the two scan lines 16a and 16b is completed, the two pixels 15a and 15b are simultaneously selected along the next two scan lines 16a and 16h as in a dotted-line arrow so as to have the projection panel 12 at the simultaneously selected pixels 15a and 15b emit the light to display an image. This operation is repeated to display the two or more images sequentially.

Third Exemplary Embodiment

Next, in regards to the first exemplary embodiment of the invention, a display method which creates the original image, i.e., regenerates the original image, through dividing the original image into two divided images and sequentially displaying the two divided images will be described as a third exemplary embodiment of the invention.

FIG. 7A shows a state of writing a first divided image, and FIG. 7B shows a state of writing a second divided image.

In FIG. 7A, when writing the first divided image, the controller 10 controls the scan line drive circuit 2 to select k-number of scan lines 7 simultaneously from a plurality of scan lines 7. Specifically, in FIG. 7A, k-number of scan lines 7 on the rows of row numbers from "1" to "k" are selected simultaneously. Those simultaneously selected scan lines are expressed as "$44_1$". Then, the controller 10 controls the data line drive circuit 3 to write the image data of the first divided image to the pixels 9 corresponding to the k-number of scan lines 7, i.e., to the pixels 9 provided at the intersections between the k-number of scan lines 7 and the data line 8, with a same signal. In this case, the pixels to which the image data is written are expressed as the pixels 41 with the row numbers from "1" to "n", and the state where the image data is simultaneously written to the pixels 41 is shown with dotted line 45.

After writing the image data to the pixels corresponding to the scan lines 7 with the row numbers "1" to "k", the controller 10 controls the scan line drive circuit 2 to select k-number of scan lines 7 on the row numbers from "k+1" to "2k". Those simultaneously selected scan lines are expressed as "$44_2$". Then, the controller 10 controls the data line drive circuit 3 to write the image data of the first divided image to the pixels 9 corresponding to the k-number of scan lines 7, i.e., to the pixels 9 provided at the intersections between the k-number of scan lines 7 and the data line 8, with a same signal. In this case, the pixels to which the image data is written are expressed as the pixels 41 with the row numbers from "1" to "n" corresponding to the scan lines $44_2$, and the state where the image data is simultaneously written to the pixels 41 is shown with the dotted line 45.

After writing the image data to the pixels corresponding to the scan lines 7 with the row numbers "k+1" to "2k", the controller 10 controls the scan line drive circuit 2 to select k-number of scan lines 7 on the row numbers from "m−k+1" to "m" including the last row number "m". Those simultaneously selected scan lines are expressed as "$44_k$". Then, the controller 10 controls the data line drive circuit 3 to write the image data of the first divided image to the pixels 9 corresponding to the k-number of scan lines 7, i.e., to the pixels 9 provided at the intersections between the k-number of scan lines 7 and the data line 8, with a same signal. In this case, the pixels to which the image data is written are expressed as the pixels 41 with the row numbers from "1" to "n" corresponding to the scan line $44_k$, and the state where the image data is simultaneously written to the pixels 41 is illustrated with the dotted line 45.

Through the above-described process, writing of the first divided image is completed under controls of the controller 10. Then, the controller 10 writes the second divided image shown in FIG. 7B.

When writing the second divided image as shown in FIG. 7B, the controller 10 controls the scan line drive circuit 2 to select the scanning lines 7 on the row numbers from "1" to "m" one by one to write the image data of the second divided image individually to the pixel 9 corresponding to the selected scanning line 7, i.e., to the pixels 9 of the column numbers from "1" to "n" provided at the intersection between the selected single scan line 7 and the data line 8.

The controller 10 divides the original image into two divided images in such a manner that the average of the brightness of the two images shown in FIG. 7A and FIG. 7B becomes equivalent to the brightness of the original image that is before being divided. The brightness herein can be considered as the luminance. The controller 10 may change the display order of the two divided images shown in FIG. 7A and FIG. 7B to display the divided image shown in FIG. 7B first, and display the divided image shown in FIG. 7A thereafter.

In FIG. 7, the pixels 41 are arranged in a square matrix of m-rows and n-columns. However, there is no restriction set for the shapes and layout of the pixels. It is possible to add the scan lines 7 for selecting dummy pixels that are not used for display or to change the number of scan lines that are selected simultaneously within a same image. Thus, the number "k" of the scan lines to be selected simultaneously does not necessarily have to be divisors of a total number "m" of the scan lines arranged within the display screen.

Further, the number of scan lines selected simultaneously may be the number other than "k". That is, it is possible to set the number of scan lines selected simultaneously for the divided images of a certain frame as "k" and to set the number of scan lines selected simultaneously for the divided images of a next frame as a value that is different from "k". Furthermore, it is also possible to change the number of scan lines to be selected simultaneously during a period where a single divided image 1 is displayed.

Fourth Exemplary Embodiment

Next, a case of calculating the luminance in the first exemplary embodiment of the invention will be described as a fourth exemplary embodiment of the invention.

A controller 10 according to the fourth exemplary embodiment of the invention is structured to include, in the two or more types of images which are displayed sequentially, the divided images of an original image whose average brightness is equivalent to the brightness of the original image, inputs an individual signal to a plurality of data lines 8, and simultaneously select two or more scanning lines 7 to display the divided images. Note here that the brightness can be considered as the luminance.

This will be described more specifically. As shown in FIG. 8A, it is assumed that an original image is displayed by using pixels 51 provided at intersections between two scan lines 7 on the rows of row numbers "x", "x+1" and three data lines 8 on the columns of column numbers "y", "y+1", "y+2". In FIG. 8A, "G(x, y)" indicates the gray scale of the original image displayed at the pixel 51 at the coordinates of (x, y). Similarly, "G(x, y+1)" indicates the gray scale of the original image displayed at the pixel 51 at the coordinates of (x, y+1), "G(x, y+2)" indicates the gray scale of the original image displayed at the pixel 51 at the coordinates of (x, y+2), "G(x+1, y)" indicates the gray scale of the original image displayed at the pixel 51 at the coordinates of (x+1, y), "G(x+1, y+1)" indicates the gray scale of the original image displayed at the pixel 51 at the coordinates of (x+1, y+1), and "G(x+1, y+2)" indicates the gray scale of the original image displayed at the pixel 51 at the coordinates of (x+1, y+2).

As shown in FIG. 8B and FIG. 8C, the two divided images are the images obtained by dividing the original image shown in FIG. 8A into two. The controller 10 displays the divided image shown in FIG. 8B on the display screen 1 by writing the image data simultaneously to the pixels corresponding to two simultaneously selected scan lines 7, and displays the divided image shown in FIG. 8C on the display screen 1 by individually writing the image data to the pixel corresponding to the scan line 7 that is selected one by one individually.

The controller 10 adjusts the brightness according to an expression (1). It is assumed that the luminance of the original image displayed at the pixel at the coordinates (x, y) is "L(x, y)", the luminance of the divided image of FIG. 8B to be displayed at the pixel at the coordinates (x, y) is "L1(x, y)", and the luminance of the divided image of FIG. 8C to be displayed at the pixel at the coordinates (x, y) is "L2(x, y)". The controller 10 substitutes L, L1, and L2 into the expression (1) to calculate the brightness.

(Expression 1)

$$L(x,y)=[L1(x,y)+L2(x,y)]/2 \quad (1)$$

In order to simplify the explanations, a case of calculating the brightness by assuming that "gamma=1" and by using gray scale instead of the luminance will be described hereinafter. Note, however, that gray scale values considering the gamma characteristic are used on the actual display screen.

The gray scale 52 of the original image displayed at the pixel of the coordinates (x, y) shown in FIG. 8A is defined as "G(x, y)", the gray scale of the original image displayed at the pixel of the coordinates (x, y) shown in FIG. 8B is defined as "G1(x, y)", and the gray scale of the divided image to be displayed at the pixel of the coordinates (x, y) shown in FIG. 8 is defined as "G2(x, y)". The controller 10 substitutes G, G1, and G2 into an expression (2) to calculate the brightness.

(Expression 2)

$$G(x,y)=[G1(x,y)+G2(x,y)]/2 \quad (2)$$

It is a presupposition of FIG. 7 that the original image is divided into two. When this is generalized to a case where the original image is divided into N-pieces of divided images, it can be defined as in an expression (3).

(Expression 3)

$$G(x,y)=[G1(x,y)+G2(x,y)+\cdots+GN(x,y)]/N \quad (3)$$

Further, when displaying the divided image shown in FIG. 8B, the controller 10 sets the mutual relation of the gray scales set for the pixels when displaying the divided image shown in FIG. 8B to be in the relation of expressions (4) in order to simultaneously select a pixel area 53 that is shown by surrounding the pixels at the coordinates (x, y) and the coordinates (x+1, y) with a dotted line.

(Expression 4)

$$G1(x,y)=G1(x+1,y)$$

$$G1(x,y+1)=G1(x+1,y+1)$$

$$G1(x,y+2)=G1(x+1,y+1) \quad (4)$$

Examples of the actual gray scales are shown in FIGS. 8D, 8E, and 8F. Numerical values show the gray scale values (0-255) of 256 gray scales.

For the divided images shown in FIG. 8B, the gray scales of the pixels on the same column selected simultaneously are of same values, i.e., the gray scale on the column "y" is 60, the gray scale on the column "y+1" is 40, and the gray scale on the column "y+2" is 20. For the divided image 2 shown in FIG. 8C, the gray scales are set for each pixel 51 in such a manner that the average gray scale of the pixel thereof and the corresponding pixel of the divided image shown in FIG. 8B becomes equivalent to the gray scale of the original image. More specifically, it is set in such a manner that the gray scale averages "(60+196)/2" and "(60+140)/2" set to the pixels 51 at the coordinates (x, y) and (x+1, y) in a simultaneously selected range 56 and an individually selected range 57 become equivalent to the gray scales 128 and 100 of the original image shown in FIG. 8D at the coordinates (x, y) and (x+1, y). This gray scale setting is conducted by the controller 10. The gray scale values shown herein are merely examples, and other combinations may be employed as well. Further, the number of scan lines to be selected simultaneously may also be different number.

Fifth Exemplary Embodiment

Next, a case of displaying each of the divided images of the original image with two or more simultaneously selected pixels will be described as a fifth exemplary embodiment of the invention.

In FIG. 9, pixels 61 are arranged in matrix within a range of n-columns and m-rows. In FIG. 9, "1"-"n" in the lateral direction indicate the column number, and "1"-"m" in the longitudinal direction indicate the row number.

As shown in FIG. 9, when displaying the divided image shown in FIG. 9A and the divided image shown in FIG. 9B, the controller 10 simultaneously selects two or more scan lines 7 for each of the divided images, and simultaneously writes the image data of the divided image at the two or more pixels corresponding to the selected scan lines 7 to display the divided images. The start positions for simultaneously selecting the scan lines 7 are set different for displaying the divided image of FIG. 9A and for displaying the divided image of FIG. 9B.

This will be described more specifically. For displaying the divided image shown in FIG. 9A, the controller 10 simultaneously selects two rows of scan lines 7 by having the scan line 7 on the first row as the start point. Further, for displaying the divided image shown in FIG. 9B, the controller 10 simultaneously selects two rows of scan lines 7 by having the scan line 7 on the second row as the start point. That is, the controller 10 shifts the start position for simultaneously selecting the scan lines 7 for displaying the divided image shown in FIG. 9B by one row with respect to the start position for simultaneously selecting the scan lines 7 for displaying the divided image shown in FIG. 9A. In other words, the controller 10 simultaneously selects the two rows of scan lines 7 by having the scan line 7 on the first row as the start point for the divided image of FIG. 9A, and simultaneously selects the two rows of scan lines 7 by having the scan line 7 on the second row as the start point for the divided image of FIG. 9B. On the outer side of the scan lines 7 on the first row and the m-th row, Scan lines for dummy pixels are disposed. Thus, the dummy scan line and the first-row scan line 7, and the dummy scan line and the m-th scan line may be used, respectively, as the set of scan lines which are selected simultaneously.

FIG. 10 shows an example of specific gray scales set for the pixels in the fifth exemplary embodiment of the invention. FIG. 10A shows the gray scales set for the pixels which display the original image, in which a gray scale 71 set for the pixel at the coordinates (x, n) is expressed as G (x, n), and a gray scale 72 set for the pixel at the coordinates (x+3, n) is expressed as G (x+3, n). FIG. 10B and FIG. 10C respectively show the two divided images of the original image shown in FIG. 10A. In FIG. 10B, a dotted line 73 shows a group of pixels selected simultaneously, and a dotted line 74 shows a gray scale set for the pixels on the same column among the simultaneously selected pixels. In FIG. 10C, a dotted line 75 shows a group of pixels selected simultaneously, and a dotted line 76 shows a gray scale set for the pixels on the same column among the simultaneously selected pixels. FIG. 10D shows the gray scales set for each of the pixels displaying the original image, FIG. 10E shows the gray scales set for each of the pixels displaying the divided image of the original image, and FIG. 10F shows the gray scales set for each of the pixels displaying the divided image of the original image. Further, in FIG. 10, "1"-"n" applied in the lateral direction of the pixel group indicate the column numbers, and "x", "x+1", "x+2", and "x+3" indicate the row numbers applied in the longitudinal direction, respectively.

There is considered a case where the gray scales set for the pixels G(x, 1) and G (x+1, 1) on a same column shown by the dotted line 74, which are within the dotted line 73 for the divided image shown in FIG. 108, are set to be in the same value as shown in FIG. 10E, and the gray scale set for the pixels G(x−1, 1) and G(x, 1) on a same column shown by the dotted line 76, which are within the dotted line 75 for the divided image shown in FIG. 10C, are set to be in the same value as shown in FIG. 10F.

The controller 10 shifts the start point for simultaneously selecting the scan lines 7 for the divided image shown in FIG. 10C by one row of scan line with respect to the start point for simultaneously selecting the scan lines 7 for the divided image shown in FIG. 10B. Therefore, the average of the gray scales set for the pixels surrounded by the dotted lines 73 and 74 of FIG. 10B and the gray scales set for the pixels surrounded by the dotted lines 75 and 76 of FIG. 10C can be made equal to the gray scale set for the pixels for the original image shown in FIG. 10D.

Sixth Exemplary Embodiment

In the above-described exemplary embodiments, when the controller 10 simultaneously selects two or more scan lines 7 from the plurality of scan lines, the targets to be selected simultaneously are set to be the neighboring scan lines 7. However, the present invention is not limited only to such case. A case of setting the targets to be simultaneously selected by the controller 10 to be other than the neighboring scan lines will be described as a sixth exemplary embodiment of the invention.

The controller 10 according to the sixth exemplary embodiment of the invention simultaneously selects two or more scan lines 7 of every other row for the divided image shown in FIG. 11A, and simultaneously selects two or more neighboring scan lines 7 for the divided image shown in FIG. 11B. In FIG. 11, "1"-"n" applied in the lateral direction of the pixel group indicate the column number, and "1"-"m" applied to the longitudinal direction indicate the row number, respectively.

As a condition for the controller 10 to select the scan lines 7 simultaneously in the sixth exemplary embodiment, the set of scan lines selected simultaneously for a plurality of divided images of an original image may be of any combinations as long as the scan lines to be selected simultaneously do not completely become the same for two or more divided images. However, when the rows of the simultaneously selected scan lines are distant from each other, distortions and the like are generated in the images when displaying the divided images at the pixels corresponding to the simultaneously selected scan lines. Thus, it is necessary to simultaneously select the scan lines 7 that are on the rows close to each other as much as possible. When having the scan lines on the adjacent rows as the targets to be selected simultaneously, the scan lines are selected as appropriate by considering the picture quality and the like of the divided image, and those are not regulated sweepingly.

FIG. 12 shows examples of gray scale setting for the divided images set by the controller 10 according to the sixth exemplary embodiment of the invention. FIG. 12A shows generalized gray scales set for the pixel group which displays the original image, FIG. 12B shows generalized gray scales set for the pixel group which displays the divided image of the original image, and FIG. 12C shows generalized gray scales set for the pixel group which displays the divided image of the original image.

In the examples shown in FIG. 12, the controller 10 simultaneously selects the scan lines 7 on the "x" row and "x+2" row shifted by one row and selects the scan lines 7 on the "x+1" row and "x+3" row shifted by one row, respectively, to display the divided image of FIG. 12B. Further, the controller 10 simultaneously selects the scan lines 7 on the neighboring rows "x−1" "x" and selects the scan lines 7 on the neighboring rows "x+1" and "x+2", respectively, to display the divided image of FIG. 12C. Furthermore, as can be seen from FIG. 12E and FIG. 12F, the controller 10 adjusts the gray scales so that the average of the gray scales set for the pixels which display the divided image of FIG. 12B and the gray scales set for the pixels which display the divided image of FIG. 12C takes the same value as the gray scales set for the pixel which display the original image shown in FIG. 12D.

Seventh Exemplary Embodiment

While the embodiments above have been described by referring to the case where the original image is divided into two divided images, a case of dividing an original image into three divided images will be described as a seventh exemplary embodiment of the invention.

As shown in FIG. 13, the controller 10 according to the seventh exemplary embodiment of the invention divides the original image into three divided images, simultaneously selects three scan lines 7 from a plurality of scan lines 7 for displaying each of the three divided images, and adjusts gray scales set for the pixels for displaying the three divided images, which correspond to the simultaneously selected scan lines 7. When adjusting the gray scales set for the pixels, the controller 10 adjusts the gray scales in such a manner that the average of the gray scales set for the pixel group which displays each of the three divided images comes to take a same value as the gray scales of the original image. Further, there is no restriction set for the number of scan lines that are selected simultaneously, as long as there are three or more scan lines 7 selected simultaneously. Moreover, the scan lines 7 selected simultaneously by the controller 10 are not limited only to the neighboring scan lines. The scan lines that are on the distant rows as in the above-described exemplary embodiment may be selected as well. Furthermore, the methods of simultaneous selections described in the above exemplary embodiments may be combined as appropriate.

Specifically, the controller 10 simultaneously selects three scan lines 81 on the neighboring rows for displaying the divided image shown in FIG. 13A, simultaneously selects three scan lines 82 on the neighboring rows for displaying the divided image shown in FIG. 13B, and simultaneously selects three scan lines 83 on the neighboring rows for displaying the divided image shown in FIG. 13C. In FIG. 13, "1"-"n" applied in the lateral direction of the pixel group for displaying the divided images indicate the column number, and "1"-"m" applied to the longitudinal direction indicate the row number, respectively.

FIG. 14 shows examples of gray scales adjusted by the controller 10. FIG. 14A shows generalized gray scales set for the pixel group which displays the original image, and FIG. 14B the specific gray scales set for the pixel group which show the original image. FIGS. 14C, 14D, and 14E respectively show the specific gray scales set for the pixel groups showing the divided images.

As can be seen from FIG. 14, the controller 10 adjusts the gray scales in such a manner that the average of the gray scales set for the pixel groups which respectively show the three divided images takes the same value as the gray scales of the original image.

Eighth Exemplary Embodiment

The controller 10 according to the seventh exemplary embodiment sets the neighboring scan lines 7 as the targets to be selected simultaneously. However, the present invention is not limited only to such case. A case of setting the targets to be simultaneously selected by the controller 10 to be other than the neighboring scan lines will be described as an eighth exemplary embodiment of the invention.

FIGS. 15A, 15B, and 15C show the pixel groups for displaying the three divided images, and each pixel group has pixels arranged in matrix of n-columns and m-rows. In FIG. 15, "1"-"n" in the lateral direction indicate the column number, and "1"-"m" in the longitudinal direction indicate the row number.

As shown in FIG. 15, when displaying each of the divided images shown in FIGS. 15A, 15B, and 15C, the controller 10 simultaneously selects two or more scan lines 7 for each of the divided images, and simultaneously writes the image data of the divided images at the two or more pixels corresponding to the selected scan lines 7 to display the divided images. The start positions for simultaneously selecting the scan lines 7 are set different for displaying the divided image of FIG. 15A, for displaying the divided image of FIG. 15B, and for displaying the divided image of FIG. 15C.

This will be described more specifically. For displaying the divided image shown in FIG. 15A, the controller 10 simultaneously selects two row of scan lines 7 by having the scan line 7 on the first row as the start point. Further, for displaying the divided image shown in FIG. 15B, the controller 10 simultaneously selects two rows of scan lines 7 by having the scan line 7 on the second row as the start point. Furthermore, for displaying the divided image shown in FIG. 15C, the controller 10 simultaneously selects two or three row of scan lines 7 by having the scan line 7 on the first row as the start point. That is, the controller 10 shifts the start position for simultaneously selecting the scan lines 7 for displaying the divided image shown in FIG. 15B by one row with respect to the start position for simultaneously selecting the scan lines 7 for displaying the divided image shown in FIG. 15A, and shifts the start position for simultaneously selecting the scan lines 7 for displaying the divided image shown in FIG. 15C by one row. On the outer side of the scanning lines 7 on the first row and the m-th row, scan lines for dummy pixels are disposed. Thus, the dummy scan line and the first-row scan line 7, and the dummy scan line and the m-th scan line may be used, respectively, as the set of scan lines which are selected simultaneously.

When the controller 10 simultaneously selects the scanning lines for each of the divided images, the number of scanning lines selected simultaneously may be set arbitrarily. However, it is necessary to prevent the same two scan lines from being simultaneously selected in common for displaying a plurality of divided images so as not to generate distortions in the picture quality and the like of the divided images. As a generalization, assuming that there are N-pieces of divided images, a pattern in which the scan lines on the neighboring rows "h" and "i" are simultaneously selected for all the divided images 1–N is not allowed to exist. Further, the number of scan lines to be selected simultaneously may be changed for each of the divided images as in FIGS. 15A, 15B, and 15C, or may be changed during the process of displaying a same divided image as in FIG. 15C.

Ninth Exemplary Embodiment

Next, an example of timing for displaying two or more types of images according to the exemplary embodiment of the invention will be described as a ninth exemplary embodiment of the invention.

In FIG. 16, the controller 10 divides an original image into two divided images 111 and 113, and inversed images 112 and 114 are included in the divided images 111 and 113. Further, the controller 10 includes a public image 115 in the image group. As shown in FIG. 16, the controller 10 displays the image group according to image display timing, i.e., the controller 10 displays the inversed image 112 continuously after the divided image 111, and displays the inversed image 114 continuously after the divided image 113. As necessary, the public image 115 is displayed continuously after the inversed image 114.

The controller 10 adjusts the brightness in such a manner that the brightness of the screen when synthesizing the divided image 111 and the inversed image 112 displayed one after another, the inversed image 112 and the divided image 113 displayed one after another, the divided image 113 and the inversed image 114 displayed one after another, respectively, becomes uniform (halftone, for example). Further, an image that has no relevancy with the original image is used for the public image 115.

The image display timing of the controller 10 according to the ninth exemplary embodiment of the invention shown in FIG. 16 is applied as appropriate to the displays of the divided images used for describing the various embodiments above.

As shown in FIG. 17, the controller 10 according to the ninth exemplary embodiment of the invention simultaneously selects two or more (k-number) scan lines 7 from a plurality of scan lines 7 to simultaneously select pixels 121 which correspond to the simultaneously selected scan lines 7 among a plurality of pixels provided at each of the intersections between the simultaneously selected scan lines 7 and a plurality of data lines 8, simultaneously writes image data to the pixels 121 on a same column surrounded by a dotted line 125 to display the image. This display method is applied to either one of the two divided images 111 and 113 shown in FIG. 16 or applied to both.

Tenth Exemplary Embodiment

Next, a case of displaying the public image 115 shown in FIG. 16 will be described as a tenth exemplary embodiment of the invention.

As shown in FIG. 17, the controller 10 according to the tenth exemplary embodiment of the invention simultaneously selects two or more (k-number) scan lines 7 from a plurality of scan lines 7 to simultaneously select the pixels 121 which correspond to the simultaneously selected scan lines 7 among a plurality of pixels 121 provided at each of the intersections between the simultaneously selected scan lines 7 and a plurality of data lines 8, simultaneously writes image data of the public image 115 to the pixels 121 on a same column surrounded by the dotted line 125 to display the public image 115. Note here that the number "k" of scan lines 123 that are selected for displaying the public image 115 is set to a small value that is in an extent with which the displayed content of the public image 115 makes sense.

For example, if the public image 115 is an image that does not require high resolution, e.g., a simple geometrical figure, the value of "k" can be set to a relatively large value. In the meantime, if it is a complicated figure or letter, the value of "k" is set to a small value. Further, when the number of pixels 123 forming the display screen is large, it is possible for "k" to take a large value. If not, the value of "k" is set to a small value. In this case, the display method of the divided images and the inversed images may be any of the display methods according to the exemplary embodiments of the invention described above. In the case where the public image 115 is displayed at the simultaneously selected pixels, for the divided images 111, 113 and the inversed images 112, 114 shown in FIG. 16; it is possible to select a plurality of scan lines 7 individually (one by one) with a line sequential driving method, and to write the image to the pixels individually.

Eleventh Exemplary Embodiment

Next, an example of image display timing in the exemplary embodiment of the invention will be described as an eleventh exemplary embodiment of the invention.

FIGS. 18A and 18B show a display example of a related technique. FIG. 18A shows a case where an original image is divided into three divided images, and those three divided images are displayed sequentially.

As shown in FIG. 18A, when a displayed divided image 131 is switched to a next divided image 132, for example, an image display light source is lighted up after writing the image data to the pixels for preventing display of the divided image 132 from being mixed into the display of the divided image 131. Therefore, a period from a signal writing end point at which image data of a given divided image is written to the pixel to a signal writing start point at which the image data of a next divided image is written to the pixel is set as a light-up period. In that case, time t1 (134) required for writing is the same for each of all the images, i.e., the divided image 131, the divided image 132, and the divided image 133, and the light-up period T1(135) is also the same for each of the divided images. Provided that a dot clock is "f1", it is assumed as follows for the scan line number "m" and the data line number "n" on the display screen. To simplify the explanations, the blanking period and the like are not taken into consideration.

(Expression 5)

$$f1=(m\times n)/t1 \tag{5}$$

FIG. 18B shows a case where a secret image (original image) that can be recognized only by a specific user is displayed as two divided images 136 and 138. Inversed images 137 and 139 respectively corresponding to the two divided images 136 and 138 are displayed continuously thereafter. Further, a public image 140 that can be recognized by unspecified people is also displayed.

In FIG. 18B, time t2 (141) required for writing each image data is the same for all the images, i.e., the divided image 136, the inversed image 137, the divided image 138, the inversed image 139, and the public image 140, and the light-up period T2(142) is also the same for all the images. Provided that a dot clock is "f2", it is assumed as follows as in the case of FIG. 18A.

(Expression 6)

$$f2=(m\times n)/t2 \tag{6}$$

FIG. 19A-*corresponds* to FIG. 18A, which shows a case of sequentially displaying three divided images in the first exemplary embodiment of the invention shown in FIG. 19A.

In FIG. 19A, a total display period (one frame period) of three divided images 151, 152, and 153 is the same as the total display period in FIG. 18A.

For displaying the preceding two divided images 151 and 152, the controller 10 according to the eleventh exemplary embodiment of the invention simultaneously writes the image data to the two or more simultaneously selected pixels (see explanations of each of the above-described exemplary embodiments), and sets a writing period 154 of the divided image 151 and a writing period 156 of the divided image 152 as "t1/2". Further, the controller 10 individually writes the image data of the remaining divided image 153 to the pixel by selecting the scan line individually, and sets a writing period of the divided image 153 as "2×t1".

As shown in FIG. 19A, the controller 10 according to the eleventh exemplary embodiment of the invention sets a display period of the two divided images 151 and 152 which are displayed by simultaneously writing the image data to two or more simultaneously selected pixels as "(t1/2+T1)", which is set shorter than a display period "[2×t1+T1]" of the divided image 153 for which simultaneous writing is not conducted.

FIG. 19B corresponds to FIG. 18B, which sequentially displays a divided image 160, an inversed image 161, a divided image 162, an inversed image 163, and a public image 164 according to the eleventh exemplary embodiment of the invention shown in FIG. 19B.

The controller 10 according to the eleventh exemplary embodiment of the invention shown in FIG. 19B displays the divided image 160, the inversed image 161, and the public image 164 of a sequential order through simultaneously writing the image data to the two or more simultaneously selected pixels. Further, the controller 10 displays the divided image 162 and the inversed image 163 of a sequential order through individually writing the image data to the individually selected pixel.

In the case of FIG. 19B, the controller 10 sets a writing period 165 of the divided image 160 and a writing period 167 of the inversed image 161 as "t2/2", and sets a writing period 169 of the divided image 162 and a writing period 171 of the inversed image 163 as "1.5×t2". The controller 10 executes simultaneous writing to the two or more simultaneously selected pixels in regards to the public image 164, and sets a writing period of the public image 164 as "t2".

That is, the controller 10 sets the displaying periods of each image in a relation of an expression (7), and the displaying period of the image for which the image data is simultaneously written is set shorter than the displaying period of the image for which the image data is individually written, as in the case of FIG. 19A.

(Expression 7)

[Divided image/Inversed image][Public image][Divided image/Inversed image]

$$[t2/2+T2]<[t2+T2]<[1.5\times t2+T2] \tag{7}$$

Therefore, the eleventh exemplary embodiment of the invention can avoid having mixture of the images through setting such displaying periods by employing the image display timing as in FIG. 19A and FIG. 19B, even if the controller 10 executes the display method which simultaneously writes the image data to two or more simultaneously selected pixels and the display method which individually writes the image data to the individually selected pixel.

Twelfth Exemplary Embodiment

The image display timing of the controller 10 according to an twelfth exemplary embodiment of the invention will be described by referring to FIGS. 19A and 19B.

Writing frequencies of each of the images 151, 152, 153, 160, 161, 162, 163, 164 will be considered with the display timing shown in FIGS. 19A and 19B.

In FIG. 19A, when writing of the divided image 151 and the divided image 152 is executed through simultaneously selecting four scan lines, a dot clock "fa" of the divided image 151 and the divided image 152 becomes as follows from the expression (5).

(Expression 8)

$$fa=(m/4\times n)/(t1/2)=f1/2 \quad (8)$$

In the meantime, a dot clock "fb" of the divided image 153 becomes as follows.

(Expression 9)

$$fb=(m\times n)/(2\times t1)=f1/2 \quad (9)$$

In FIG. 19B, when writing of the divided image 160, the inversed image 161, and the public image 164 is executed through simultaneously selecting four scan lines, a dot clock "fc" of the divided image 160 and the inversed image 161 becomes as follows from the expression (6).

(Expression 10)

$$fc=(m/4\times n)/(t2/2)=f2/2 \quad (10)$$

In the meantime, a dot clock "fd" of the public image 164 becomes as follows.

(Expression 11)

$$fd=(m/4\times n)/t2=f2/4 \quad (11)$$

In the meantime, since writing is executed individually for the divided image 162 and the inversed image 163, a dot clock thereof becomes as follows.

(Expression 12)

$$fd=(m\times n)/(1.5\times t2)=f2\times 2/3 \quad (12)$$

As described above, with the twelfth exemplary embodiment of the invention, the highest dot clock in the case of FIG. 19A is "f1/2" and the highest dot clock in the case of FIG. 19B is "f2×2/3". Therefore, it is possible to decrease each of those dot clocks compared to "f1" and "f2" which are the dot clocks of the conventional display examples shown in FIGS. 18A and 18B.

A modification example of the twelfth exemplary embodiment of the invention will be described. In FIG. 19A, the dot clocks of the divided images are consistent in all the three divided images 151, 152, and 153 based on the expression (8) and the expression (9).

In the case of FIG. 19B, there are three types of dot clocks. However, it is possible with the case of FIG. 19B to make the dot clocks consistent through shortening the writing periods of the divided image 160, the inversed image 161, and the public image 164 further, and distributing the extra time generated thereby for the divided image 162 and the inversed image 163 or distributing it to a light-up period. For example, when simultaneously writing the image data by simultaneously selecting the four scan lines, the dot clocks can be made "f2×⅔" for all the images 160-164 through setting the writing periods of the divide image 160, the inversed image 161, and the public image 164 as "t2×⅜" and setting the writing periods of the divided image 162 and the inversed image 163 as "1.5×t2".

A modification example of the twelfth exemplary embodiment of the invention will be described. In FIG. 19B, the relation regarding the frequencies required for driving is 1/2 times, 1/4 times, and 1/1.5 times from the expressions (10), (11), (12), when f2 is set as a reference, and it can be generated with a simple frequency divider circuit.

While the display frequencies have been described heretofore by referring to the case of the dot clocks, it is also possible to reduce the loads in terms of the circuits through standardizing the clocks required for driving such as a control frequency of the image display control device, a horizontal synchronous frequency, and a vertical synchronous frequency as much as possible or making those in a relation that can be easily generated. For example, in the case of FIG. 19B, there are three types of dot clocks that are required. However, only one type is required for the horizontal synchronous frequency.

Thirteenth Exemplary Embodiment

The image display timing of the controller 10 according to a thirteenth exemplary embodiment of the invention will be described by referring to FIG. 20.

As in the case of FIG. 18A, FIG. 20A shows a case of sequentially displaying three divided images 181, 182, and 183. A total display time (one frame period) in FIG. 20A for displaying all the three divided images 181, 182, and 183 is set to be the same as the total display time in FIG. 19A.

For writing the two divided images 181 and 182 shown in FIG. 20A, the controller 10 according to the thirteenth exemplary embodiment of the invention simultaneously writes the image data to the two or more simultaneously selected pixels to display the images, and sets a writing period 184 of the divided image 181 and a writing period 186 of the divided image 182 as "t1/2", respectively. Further, for the divided image 1.83 shown in FIG. 20A, the controller 10 individually writes the image data to the pixel selected individually to display the image, and sets a writing period 188 of the divided image 183 as "1.5×t1".

With the thirteenth exemplary embodiment of the invention, one-frame periods are the same. Therefore, a light-up period 185 for the divided image 181, a light-up period 187 for the divided image 182, and a light-up period 189 for the divided image 183 can be leveled to be extended to "[T1+t1/6]".

At this time, provided that the number of simultaneously selected scan lines is 3 or larger, the maximum value of the dot clock becomes a dot clock "fe" of the divided image 183, which is expressed with an expression (13).

(Expression 13)

$$fe=(m\times n)/(1.5\times t1)=f1\times 2/3 \quad (13)$$

Further, the light-up period becomes longer than "T1", and the dot clock takes a value smaller than "f1". When the number of simultaneously selected scan lines is 2, the dot clock becomes the maximum for the divided image 181 and the divided image 182, and the frequency thereof is "f1". In that case, there is no change in the maximum value of the dot clock; however, the light-up period becomes longer. In order to decrease the driving frequency from that of the initial state, it is necessary to decrease allotment to the divided image 183 or to the light-up periods of each image.

In a case where a high priority is placed on the brightness over the driving frequency, the average light-up period can be extended to "[T1+t1/3]" through decreasing the writing period of the divided image 183 from "1.5×t1" to "t1".

Further, the thirteenth exemplary embodiment of the invention will be described by referring to FIG. 20B. FIG. 20B corresponds to FIG. 18B, and the total displaying period (one-frame period) in both cases is the same. The controller 10 according to the thirteenth exemplary embodiment of the invention displays the images, i.e., a divided image 1901, an inversed image 1902, and a public image 1905, through simultaneously writing the image data by simultaneously selecting two or more scan lines. Further, the controller 10 sets a writing period 1906 of the divided image 1901, a writing period 1908 of the inversed image 1902, and a writing period 1914 of the public image 1905 to "t2/2", and sets a writing period 1910 of the divided image 1903 and a writing period 1912 of the inversed image 1904 as "t2".

The controller 10 allots the time shortened in writing to the light-up periods to set a light-up period 1907 of the divided image 1901, a light-up period 1909 of the inversed image 1902, a light-up period 1911 of the divided image 1903, and a light-up period 1913 of the inversed image 1904 as "[T2+t2/4]", and sets a light-up period 1915 of the public image 1905 as "[T2+t2/2]". The dot clocks for the divided image 1903 and the inversed image 1904 remain as "f1". However, the light-up periods can be extended, so that luminance of the displayed images can be increased.

When the number of images whose image data is simultaneously written to the pixels that are simultaneously selected by the controller 10 is set as 3 or larger, the dot clock is lower than "f1" if the writing period of the images set by the controller 10 is "t2/2". Thus, it is possible to allot the difference further to the light-up periods to increase the luminance of the displayed images or to allot the difference to the writing periods of the images with a high dot clock so as to decrease the driving frequency.

Furthermore, the thirteenth exemplary embodiment of the invention will be described by referring to FIG. 20C. FIG. 20C corresponds to FIG. 18B. In the case of FIG. 20C, for all the display images, i.e., a divided image 1916, an inversed image 1917, a divided image 1918, an inversed image 1919, and a public image 1920, the controller 10 simultaneously writes each image data to two or more simultaneously selected pixels, sets the writing period of each image as "t2/2" for all the images, and allots the time shortened in writing of the images to the light-up time of each image to set the light-up time as "[T2+t2/2]" for all the images. The number of pixels to which the image data is simultaneously written may vary for each of the images to be displayed. When the number of pixels to which the image data is written simultaneously is the same for all the images to be displayed, the dot clocks and the horizontal synchronous frequencies can be made uniform.

Fourteenth Exemplary Embodiment

In a display system according to a fourteenth exemplary embodiment of the invention, as shown in FIG. 19 and FIG. 20, the light-up periods are kept almost uniform regardless of the writing methods of the divided images.

The fourteenth exemplary embodiment of the invention uses an optical shutter 203, as shown in FIG. 21, and the optical shutter 203 is opened by synchronizing with display image light 205 of the divided image in accordance with a synchronous signal from a display unit main body 201 for allowing only a user of the optical shutter 203 to recognize the divided images. Further, in the fourteenth exemplary embodiment of the invention, two or more types of images to be displayed sequentially are configured with a plurality of divided images as secret images that can be recognized only by a specific user, and inversed images which are inversions of each of the secret images.

FIG. 22A shows the display timing at which three divided images are displayed on a display panel 202 of the fourteenth exemplary embodiment of the invention, and FIG. 22B shows the open/close timing for opening and closing the optical shutter 203.

As shown in FIG. 22A, when the controller 10 respectively sets open periods 227, 228, and 229 where the optical shutter 203 opens for three secret images (divided images) 211, 213, and 215, the recognition periods of the divided secret images (=accumulated time of the light amount entering the eyes) within the display allotted times 211, 213, and 215 for each image are determined depending on the open periods 227, 228, and 229 of the optical shutter 203. Therefore, as long as a period from the vicinity of an end point of signal input for an image to be displayed to the vicinity of a start point of signal input for a next image to be displayed is longer than the open period of the optical shutter 203, the period from the vicinity of the end point of signal input for an image to be displayed to the vicinity of the start point of signal input for a next image to be displayed does not necessarily have to be uniform. The open period of the optical shutter 203 only needs to be uniform for each of the divided images. FIG. 22B shows a case where the open periods 227, 228, and 229 of the optical shutter 203 are made uniform in accordance with the display light-up periods 222, 223, and 224 of each divided images.

Fifteenth Exemplary Embodiment

Display timing as an example of a display system according to a fifteenth exemplary embodiment of the invention will be described by referring to FIG. 23. In this example, for a divided image 231, an inversed image 232, a divided image 233, an inversed image 234, and a public image 235, the respective image data is simultaneously written to a plurality of pixels which correspond respectively to two or more simultaneously selected scan lines, and those images are displayed simultaneously on the display screen. A simultaneous writing period 236 of the divided image 231 and a simultaneous writing period 238 of the inversed image 232 are set as "t2/2", respectively, a simultaneous writing period 240 of the divided image 233 and a simultaneous writing period 242 of the inversed image 234 is set as "t2/2", respectively, and a simultaneous writing period 244 of the public image 235 is set as "t2/t", respectively.

With the above-described display method, it is difficult to regenerate the original image precisely through displaying the divided images. Therefore, the light-up periods 237, 239, 241, and 243 of those are set uniform as "T2", and the light-up period of the public image 253 displayed individually is extended to "[T2+t2/2]" for increasing the brightness. If it is unnecessary to increase the brightness of the public image 235, this increased value "t2/2" may be distributed equally to the light-up periods of the divided images 231, 233 and the inversed images 232, 234.

When a material that requires time from an input of a signal till an actual response, e.g., a liquid crystal, is used for displaying the divided images, there is a possibility of having a difference in the display states of the images due to a difference in the writing periods, when the response time is so much longer than the writing period that it cannot be ignored (there is no problem if the response time is sufficiently shorter compared to the writing period) even if the light-up periods are uniform. Such issues are dealt by changing the voltage applied to the pixels in accordance with the difference in the writing periods for each of the divided images or by changing the time from the end of writing till the start of light-up (start of image recognition), for example.

Next, a modification example of the fifteenth exemplary embodiment of the invention will be described by referring to FIG. 21. Two or more types of images displayed sequentially are configured with divided images of a secret image that can be recognized only by a specific person, inversed images of the respective secret images, and a public image that can be recognized by unspecified people. Through the use of the optical shutter 203, only the user of the optical shutter 203 becomes capable of recognizing the secret images. The open/close timing of the optical shutter 203 is adjusted by a synchronous signal 204 transmitted by a wired or wireless device. For the optical shutter 203, a polarization control member such as a liquid crystal may be used. Alternatively, a mechanical shutter may be used as well. Further, there is no limit set for the shape of the optical shutter, as long as it can be placed between the user and the display panel. While an eyeglass type or the like is desirable, for example, any other shapes may be employed as well.

Sixteenth Exemplary Embodiment

FIG. 24 shows the display timing of the images according to a sixteenth exemplary embodiment of the invention, and FIG. 25 shows specific examples of gray scale values set for each of the images shown in FIG. 24.

In the sixteenth exemplary embodiment of the invention, as shown in FIG. 24, a divided image 251, an inversed image 252, a divided image 253, an inversed image 254, and a public image 255 are displayed in this order. For simplifying the explanations, it is assumed as "gamma=1" as in the examples above, and gray scale values shown in FIG. 25 are used for the explanation. FIG. 25A shows gray scale values of an original image, and the gray scale values of the original image are set, respectively, to pixels 261 on the column numbers "y", "y+1", "y+2" and on row numbers "x", "x+1" arranged in matrix.

FIG. 25B shows gray scale values of the divided image (divided image 251 of FIG. 24) of the original image shown in FIG. 25A. For the divided image 251, the controller 10 simultaneously inputs a same signal 263 to the pixels 261 on a same column (x, y) and (x+1, y) corresponding to two simultaneously selected scan lines to write the image data to the pixels 261 on the same column simultaneously. For the inversed image (inversed image 252 of FIG. 24), the controller 10 simultaneously inputs a same signal. 265 to the pixels 261 on the same column (x, y) and (x+1, y) corresponding to two simultaneously selected scan lines to write the image data to the pixels 261 on the same column simultaneously, as in the case of the divided image 251. At that time, the controller 10 sets the average of the brightness of the divided image 251 and the brightness of the inversed image 252 to a uniform value. The controller 10 simultaneously selects the pixels 261 on the same column for the divided image 251 and the inversed image 252, and shifts the pixels 261 on the same column in the direction of the column number in order. Note here that it is desirable for the uniform brightness average of the divided image and the inversed image to be in a value close to the halftone.

For the divided image 253 of FIG. 24, the controller 10 individually inputs a same signal 264 to the pixels 261 on the same column (x, y) and (x+1, y) corresponding to the scan line selected individually one by one to write the image data to the pixels 261 individually. For the inversed image (the inversed image 254 of FIG. 24), the controller 10 individually inputs a same signal 266 to the pixels 261 on the same column (x, y) and (x+1, y) corresponding to the scan line selected individually one by one to write the image data to the pixels 261 individually, as in the case of the divided image 253. At that time, the controller 10 sets the average of the brightness of the divided image 253 and the brightness of the inversed image 254 to a uniform value. The controller 10 individually selects the pixels 261 on the same column for the divided image 253 and the inversed image 254, and shifts the pixels 261 on the same column in the direction of the column number in order. Note here that it is desirable for the uniform brightness average of the divided image and the inversed image to be in a value close to the halftone.

In the examples described heretofore, the divided images and the inversed images thereof which can generate uniform images by being superimposed on the divided images are displayed sequentially in a switching manner. This is for displaying the public image that can be viewed by unspecified people. Such public image does not necessarily have to be present. In that case, the image inserted between the divided images may be a random image that is irrelevant to the original image and the divided images.

Seventeenth Exemplary Embodiment

As a method for displaying the images on the display screen, it is possible to employ a method that is normally seen in a liquid crystal display of a PC and the like, which has two modes, i.e., a mode (normal display mode) that displays one type of image and a mode that sequentially displays two or more types of images, and uses the two modes in a switching manner.

In that case, regarding a backlight, the controller 10 selects light-up suited for the respective modes, such as constant light-up for the normal display mode and specific-period light-up for the sequential display mode, for example. Further, the controller 10 adjusts the number of pixels corresponding to the two or more simultaneously selected scan lines and the writing periods so as to put the various types of clock frequencies used for controlling the display timing with the both display modes, i.e., the control frequency of the image display control device, the horizontal synchronous frequency, the vertical synchronous frequency, the dot clock, etc., to be uniform or in a relation that can be easily generated by multiplication or division of the frequencies.

Regarding the display system for displaying a plurality of images by switching those at a high speed, the exemplary embodiments of the invention can provide the display system which is capable of reducing the driving frequency and capable of increasing the brightness of the displayed images without increasing the driving frequency, and provide the display method of the display system. Further, it is also possible to put the contents executed by each step of the display method described above into a program, and have it executed by a computer of the display system.

While the present invention has been described by referring to the embodiments (and examples), the present invention is not limited only to those embodiments (and examples) described above. Various types of modifications that occur to those skilled in the art can be applied to the structures and details of the present invention within the scope of the present invention.

INDUSTRIAL APPLICABILITY

The present invention makes it possible to achieve plural image display which allows recognition of specific images only to the user of a high-definition panel that displays the images, a notebook personal computer, a portable terminal, a portable telephone, and the like with a relatively low driving frequency. Therefore, the present invention exhibits the appli-

BRIEF DESCRIPTION OF THE DRAWINGS

FIGS. 7A and 7B show illustrations for describing operations for displaying an image in a third exemplary embodiment of the invention;

FIGS. 9A and 9B show illustrations for describing image display in a fifth exemplary embodiment of the invention;

FIGS. 10A-10F show illustrations for describing adjustment of gray scales in the fifth exemplary embodiment of the invention;

FIGS. 11A and 11B show illustrations for describing image display in a sixth exemplary embodiment of the invention;

FIGS. 12A-12F show illustrations for describing adjustment of gray scales in the sixth embodiment of the invention;

FIGS. 13A-13C show illustrations for describing image display in a seventh exemplary embodiment of the present invention;

FIGS. 14A-14E show illustrations for describing adjustment of gray scales in the seventh embodiment of the present invention;

FIGS. 15A-15C show illustrations for describing image display in an eighth exemplary embodiment of the invention;

FIG. 16 shows illustrations for describing image display in a ninth exemplary embodiment of the invention;

FIG. 17 shows illustrations for describing image display in the ninth exemplary embodiment of the invention;

FIGS. 18A and 18B illustrate charts showing the image display timing of the related art;

FIGS. 19A and 19B illustrate charts showing the image display timing according to an eleventh embodiment of the present invention;

FIGS. 20A-20C illustrate charts showing the image display timing according to a thirteenth exemplary embodiment of the invention;

FIGS. 25A-25E show illustrations for describing adjustment of gray scales in the sixteenth exemplary embodiment of the invention;

FIGS. 26A-26C illustrate charts showing the image display timing of the related art;

FIG. 28 shows illustrations for describing divided images of the original image shown in FIG. 27;

FIGS. 29A-29C show illustrations for describing a process of displaying images sequentially with the related art; and FIG. 30 shows illustrations for describing a process of displaying the displayed images sequentially with the related art.

REFERENCE NUMERALS

Figure 1:
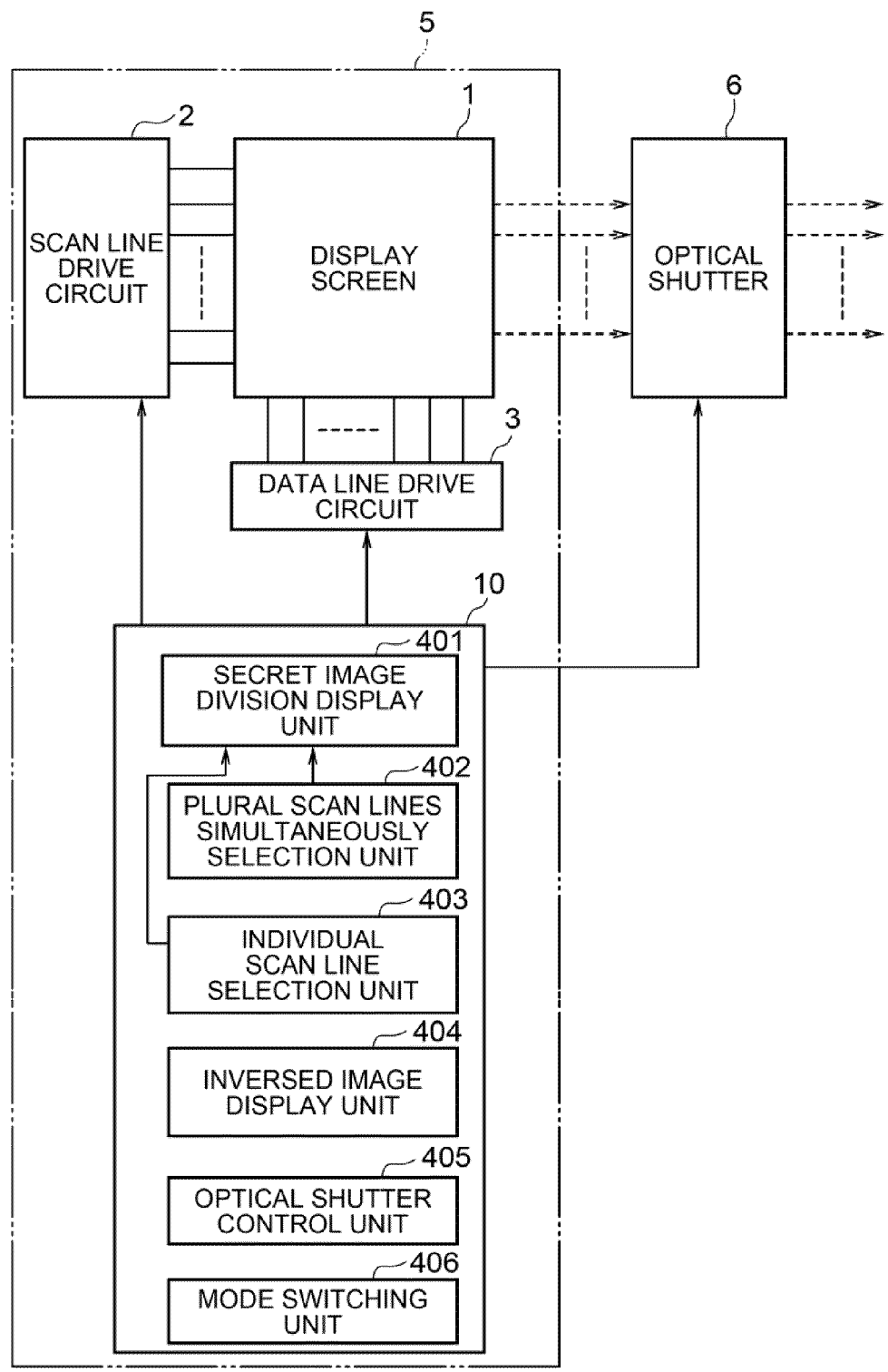
FIG. 1 is a block diagram showing a structure of a display system according to exemplary embodiments of the invention.
Figure 2:
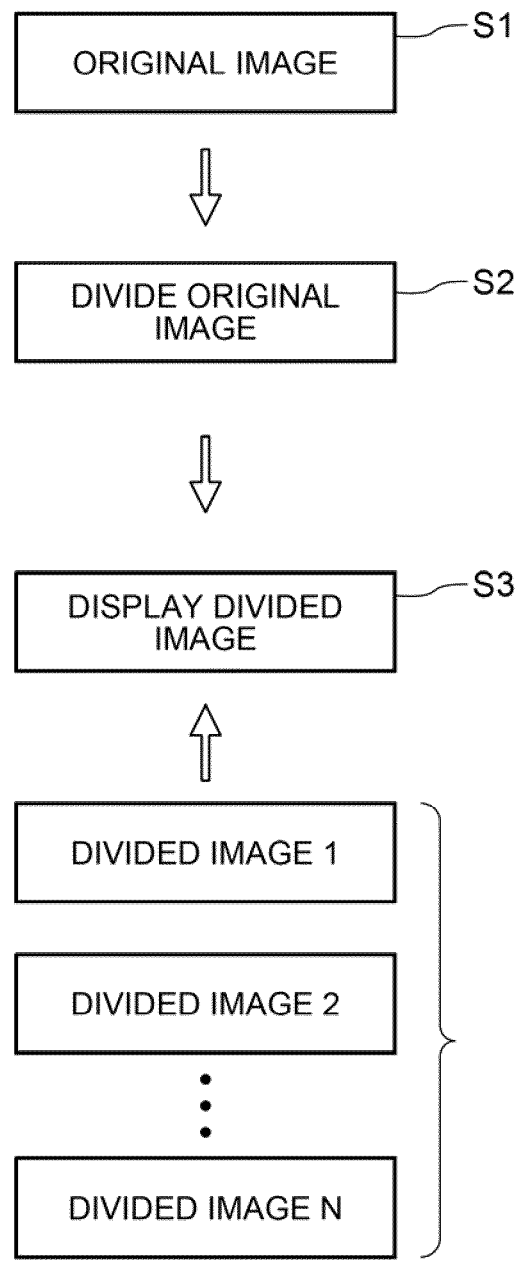
FIG. 2 is a flowchart for describing a process of displaying an image in the exemplary embodiments of the invention.
Figure 3A:
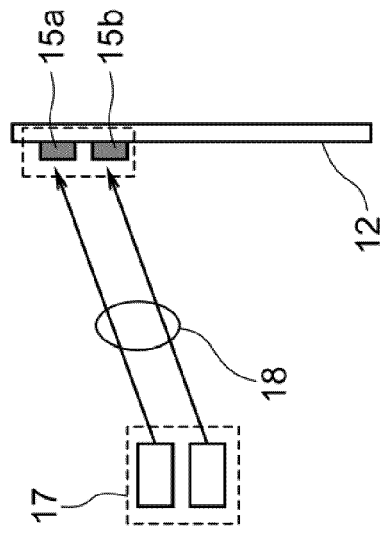
FIGS. 3A-3D illustrate a comparison of image display according to the exemplary embodiments of the invention and image display according to a related art.
Figure 3B:
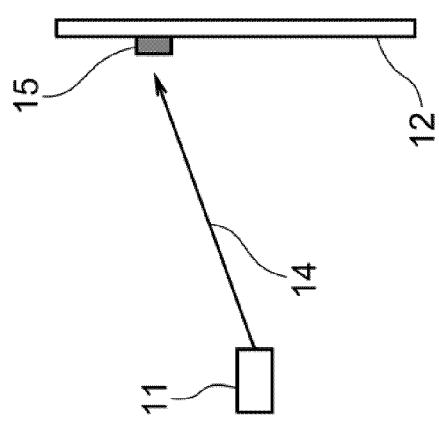
Figure 3C:
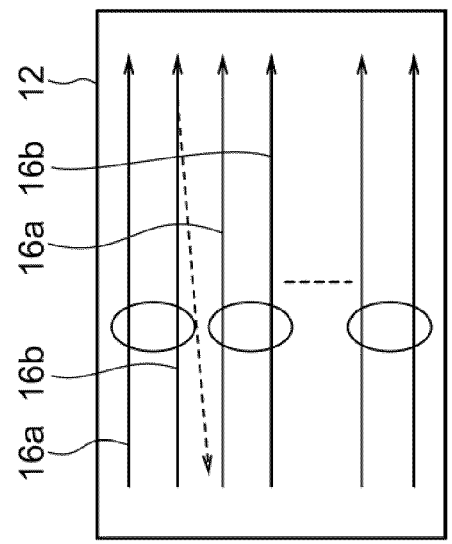
Figure 3D:
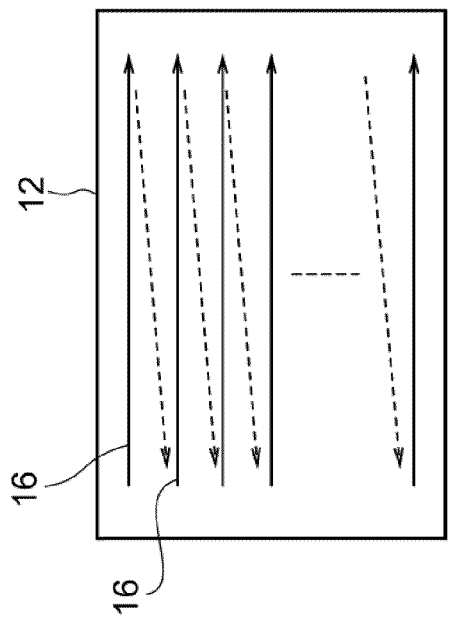
Figure 4:
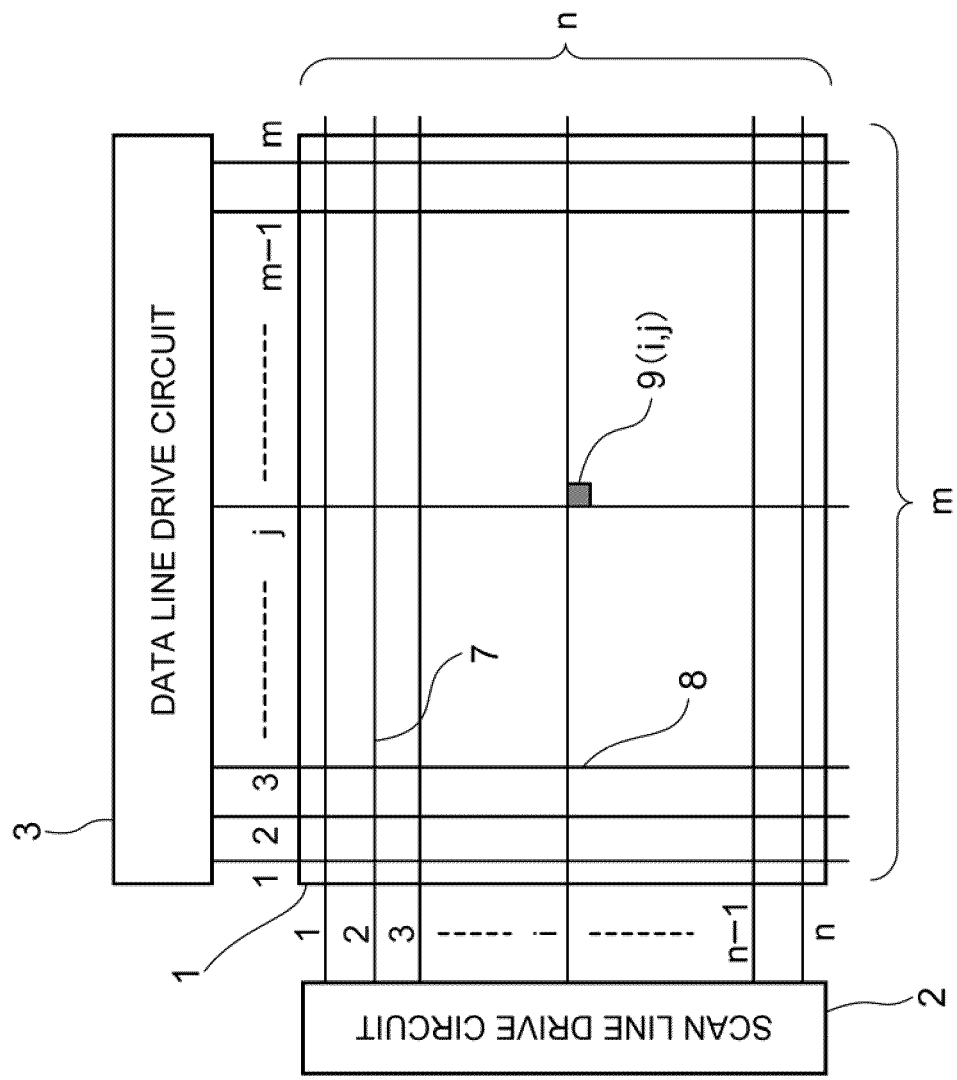
FIG. 4 is an illustration showing a display screen of a display system according to a first exemplary embodiment and a second exemplary embodiment of the invention.
Figure 5:
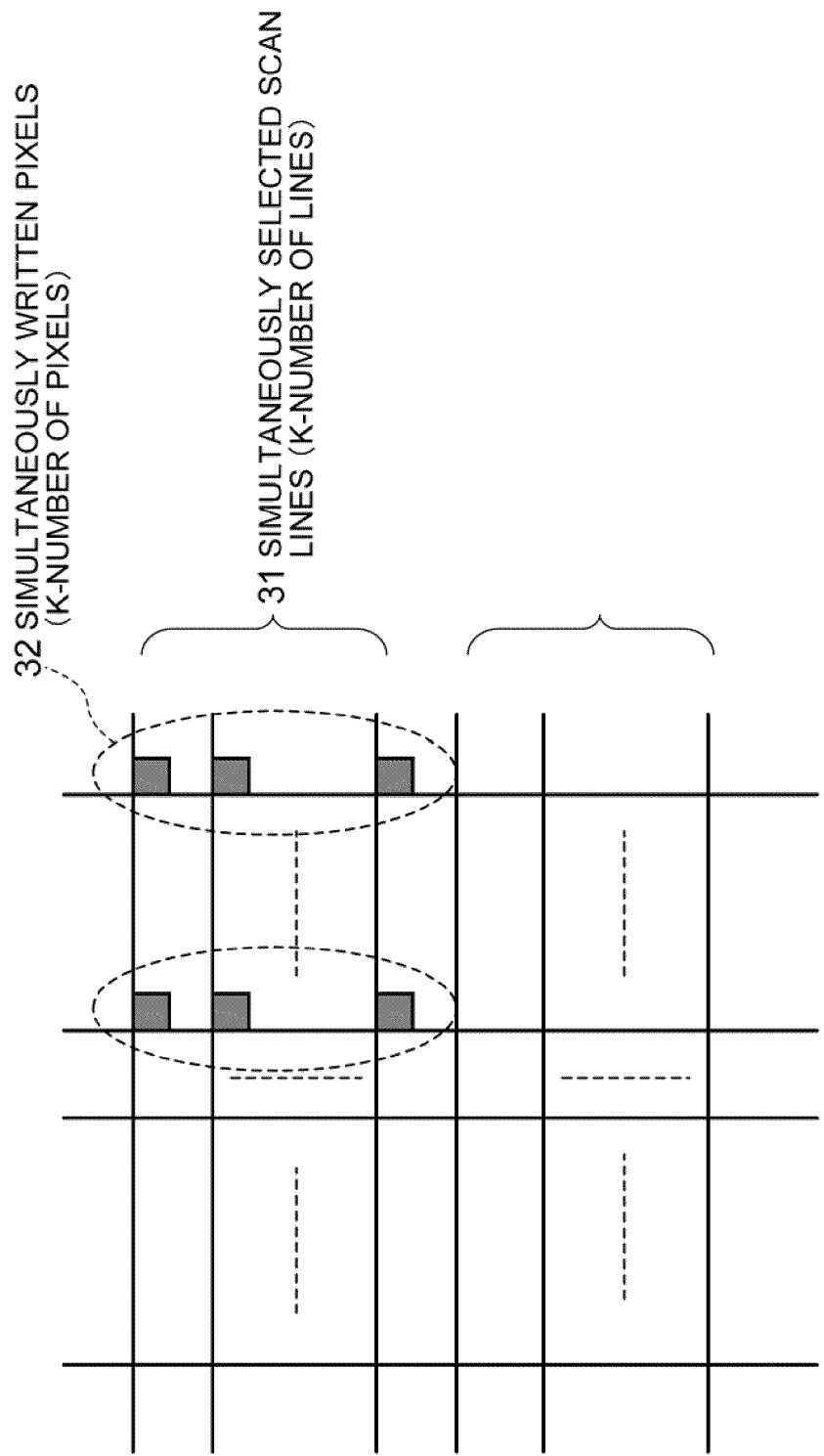
FIG. 5 is an illustration for describing an image display method according to the first exemplary embodiment and the second exemplary embodiment of the invention.
Figure 6:
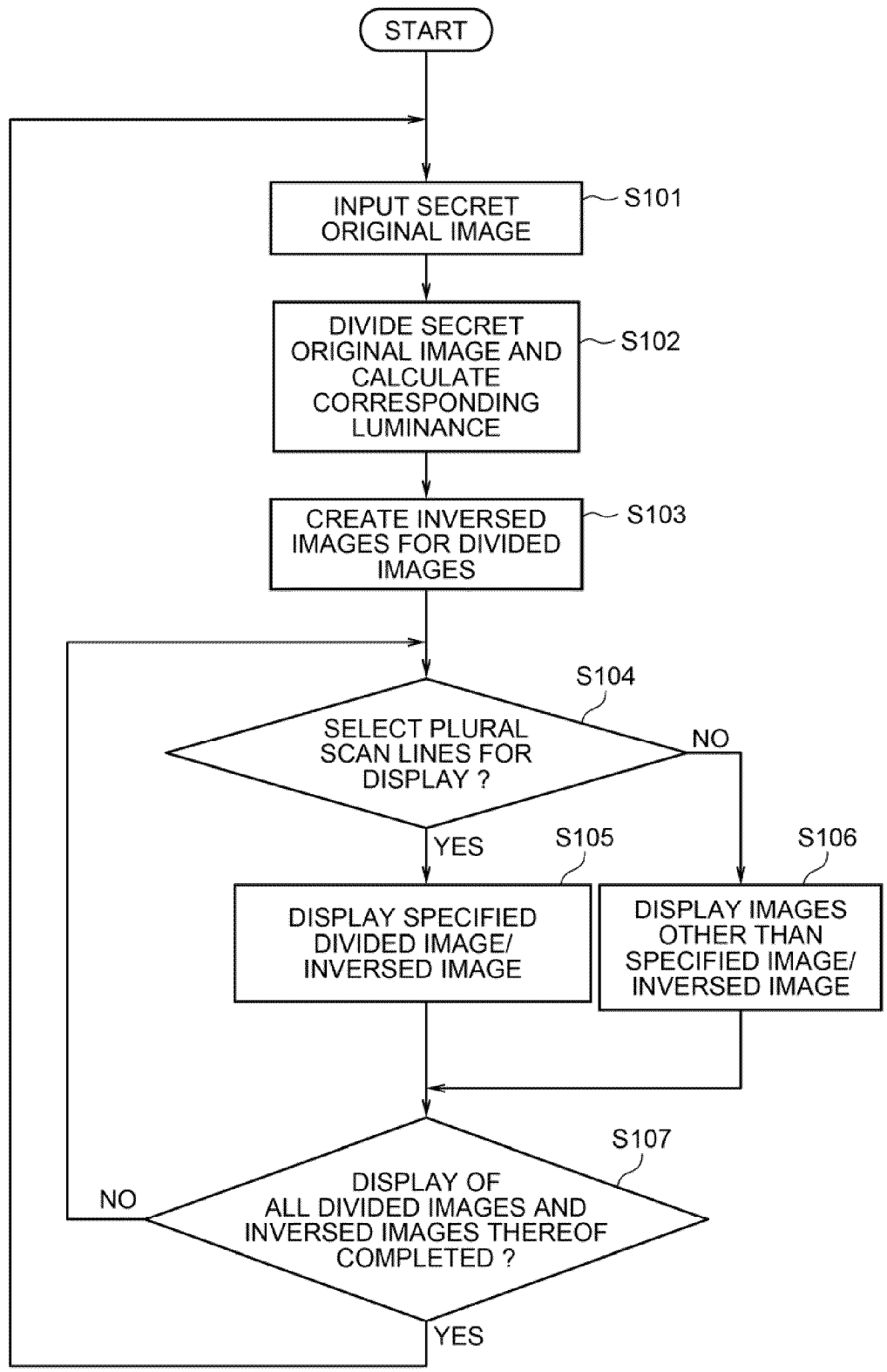
FIG. 6 is a flowchart for describing a process of displaying an image in the first exemplary embodiment of the invention.
Figure 8A:
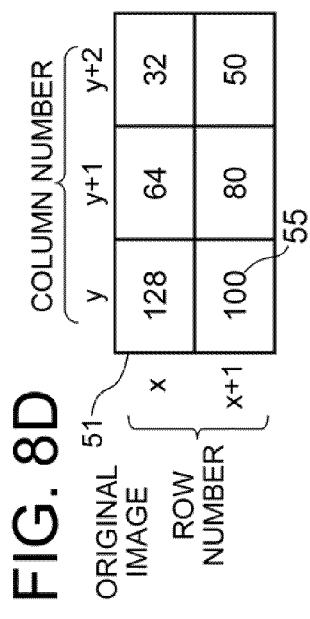
FIGS. 8A-8F show illustrations for describing adjustment of gray scales in a fourth exemplary embodiment of the invention.
Figure 8B:
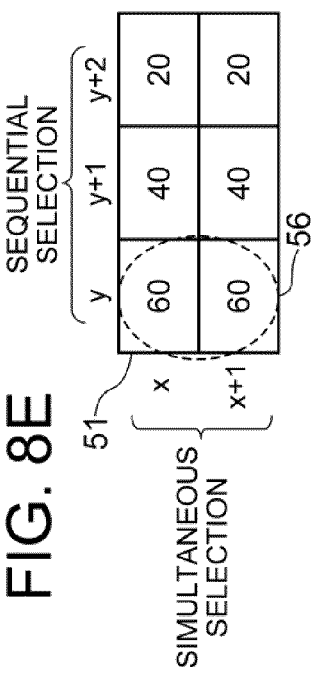
Figure 8C:
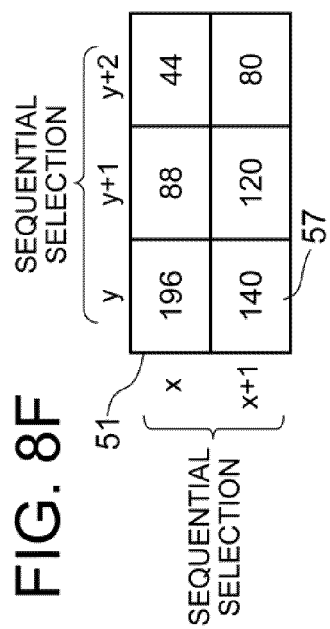
Figure 8D:
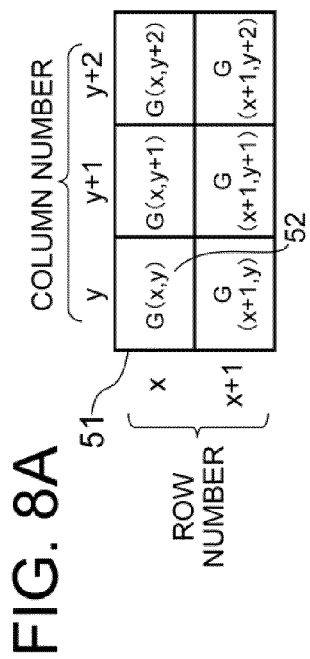
Figure 8E:
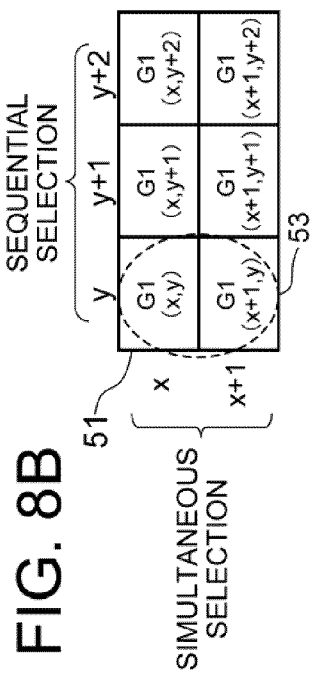
Figure 8F:
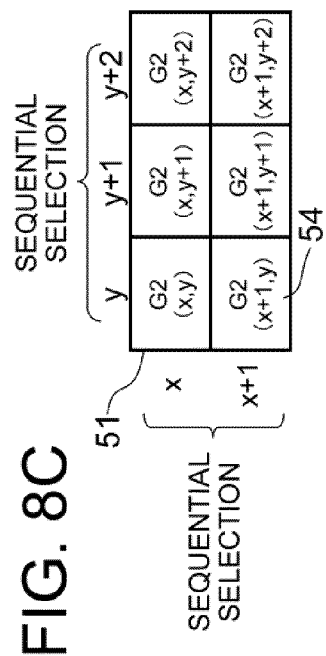
Figure 21:
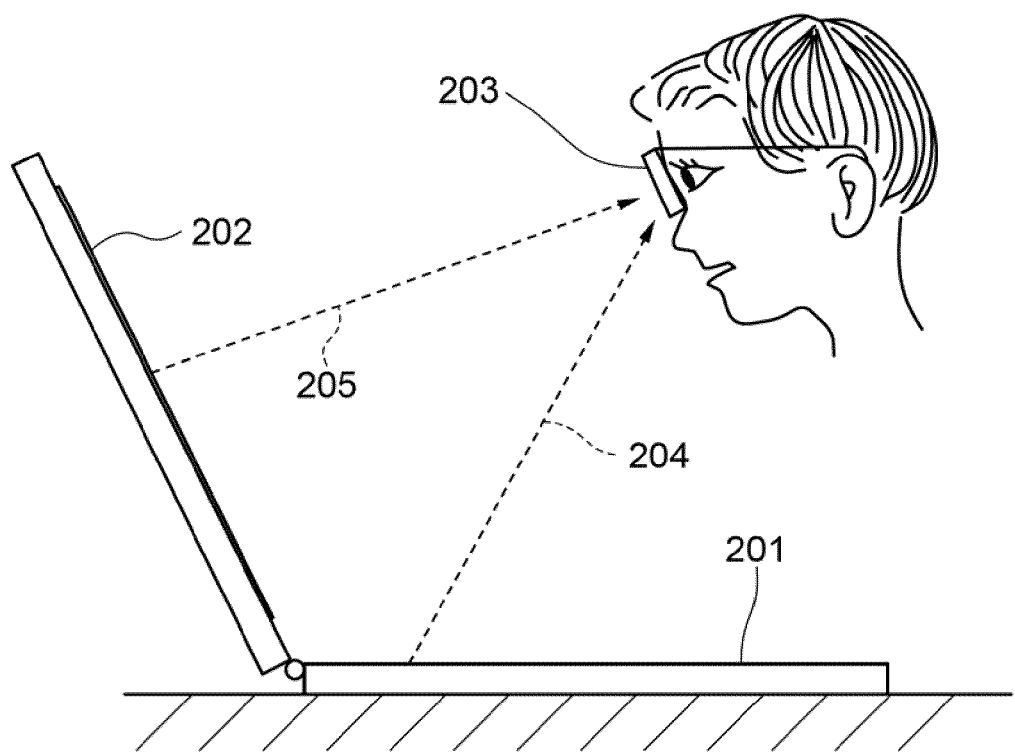
FIG. 21 is an illustration for describing image display using an optical shutter according to a fourteenth exemplary embodiment of the invention.
Figure 22:
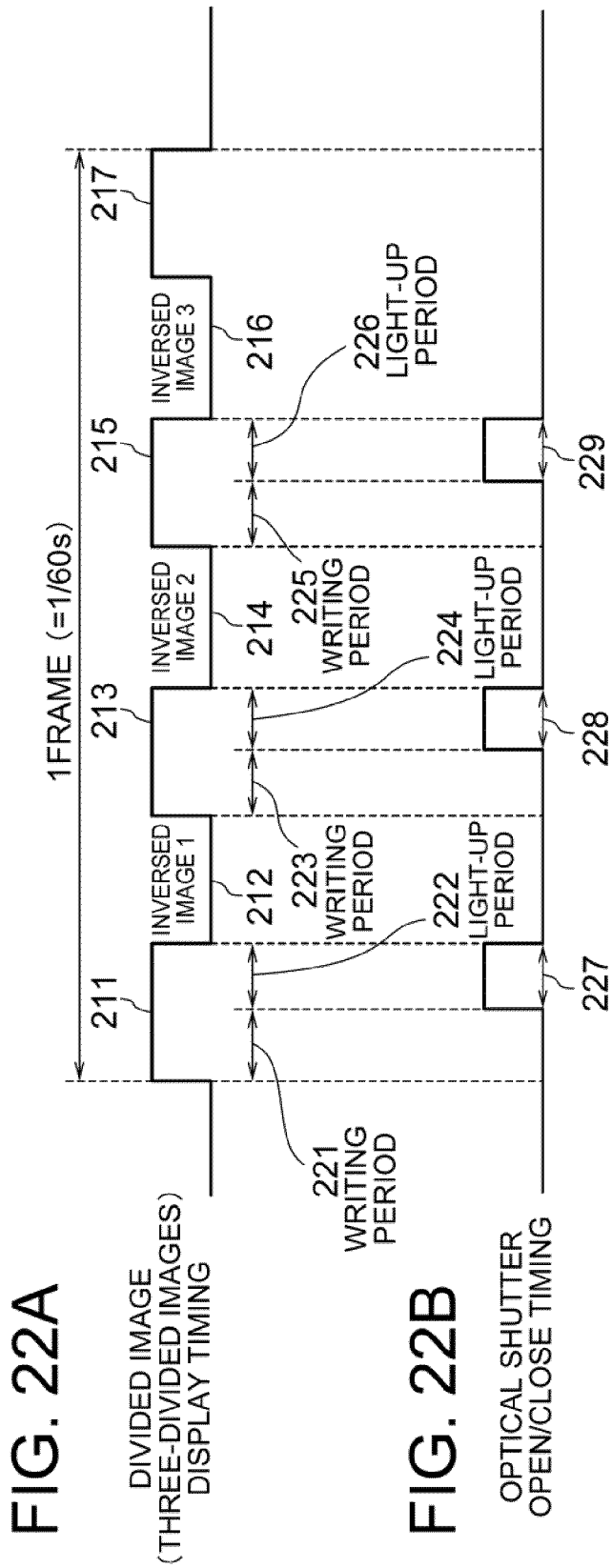
FIGS. 22A and 22B are charts showing open/close timing of the optical shutter according to the fourteenth exemplary embodiment of the invention.
Figure 23:
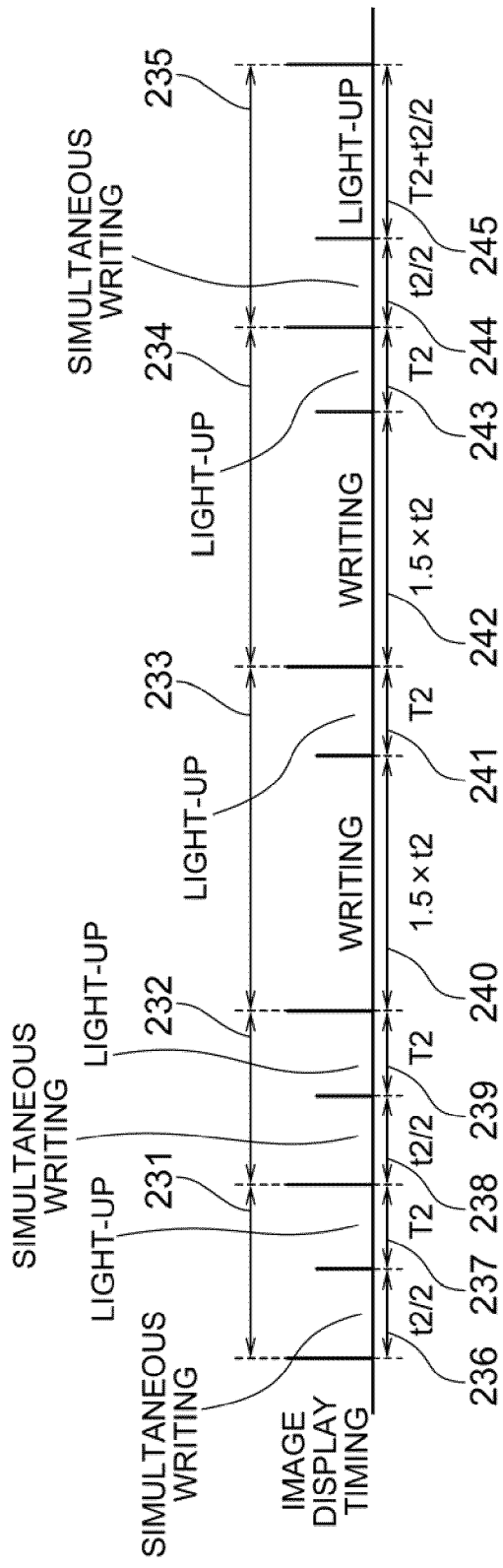
FIG. 23 illustrates charts showing the image display timing according to a fifteenth exemplary embodiment of the invention.
Figure 24:
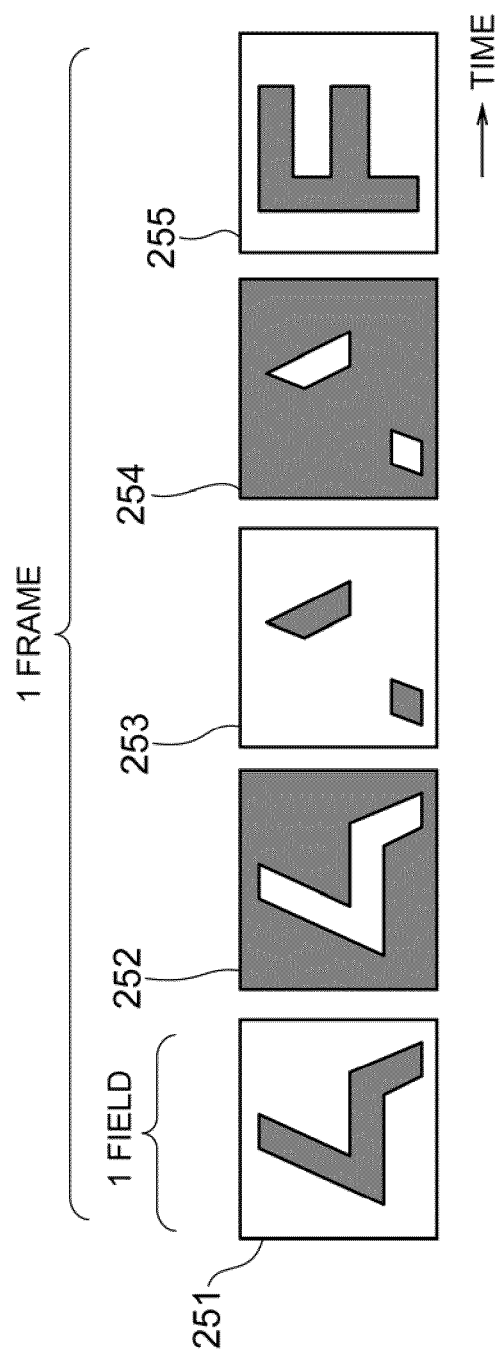
FIG. 24 shows illustrations for describing image display in a sixteenth exemplary embodiment of the invention.
Figure 27:
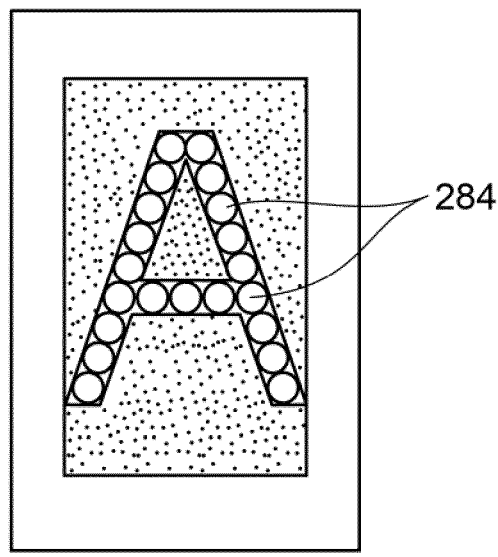
FIG. 27 is an illustration for describing an example of an original image.

1 Display screen
2 Scan line drive circuit
3 Data line drive circuit
10 Controller

The invention claimed is:

1. A display system which repeatedly displays a frame in which two or more types of images are sequentially displayed on a display screen within one period of the frame by writing image data while scanning pixels on the display screen, the display system comprising:
a controller which simultaneously selects two or more pixels of the display screen for a specific image among the two or more types of images, writes a same image data to the two or more selected pixels to display the specific image with a simultaneous writing method, individually selects the pixels of the display screen for images other than the specific image, and individually writes an image data to the individually selected pixels to display the images other than the specific image with a simultaneous writing method so as to control display of those images, wherein
the controller has a function of executing the display with the simultaneous writing method and the display with the individual writing method sequentially and repeatedly, and reducing the writing period of the specific image within one period of the frame with the simultaneous writing method, and further, the controller has:
a function of decreasing the writing frequency of the images sequentially displayed by allotting an extra time generated by making a writing period shorter, to the writing periods of the images sequentially displayed on the display screen within one frame period, or a function of increasing the brightness of the images without increasing the writing frequency of the images sequentially displayed by allotting the extra time to a period for determining brightness of the images sequentially displayed on the display screen within one frame period, or a function of decreasing the writing frequency of the images sequentially displayed and increasing the brightness of the images by allotting the extra time to both of the writing period and the period for determining the brightness of the images.

2. The display system as claimed in claim 1, the display screen being a display screen configured with a plurality of pixels provided by corresponding to each intersection point between a plurality of scan lines and a plurality of data lines, the display system comprising:

a scan line drive circuit which selects the pixels by scanning the plurality of scan lines in order; and a data line drive circuit which writes the image data to the pixels selected by the scan line drive circuit, wherein the controller drive-controls the scan line drive circuit and the data line drive circuit to simultaneously select two or more scan lines from the plurality of scan lines for a specific image among the two or more types of images, simultaneously writes the same image data to two or more pixels corresponding to the two or more scan lines to display the specific image, individually selects the plurality of scan lines for images other than the specified image, and writes the image data individually to the pixels corresponding to the individually selected scan lines to display the images other than the specific image so as to display those images sequentially on the display screen.

3. The display system as claimed in claim 2, wherein the controller controls to display the specific image by writing the image data to the two or more pixels corresponding to the two or more simultaneously selected scan lines, and controls to display the images other than the specific image by writing the image data to the pixel corresponding to the scan line selected one by one so as to display those images sequentially on the display screen.

4. The display system as claimed in claim 2, wherein the controller includes, in the two or more types of images, divided images of an original image whose average brightness becomes equivalent to brightness of the original image for each corresponding pixel, simultaneously selects the two or more scan lines, and writes a same image data of the divided image to the two or more pixels corresponding to the scan lines.

5. The display system as claimed in claim 2, wherein the controller:

includes, in the two or more types of images displayed sequentially, a secret image that can be recognized only by a specific person and an inversed image which can generate an image of uniform brightness by being superimposed on the secret image, and generates a plurality of divided images from the secret image;

average brightness of the plurality of divided images is equivalent to brightness of the secret image for each corresponding pixel; and includes, in the plurality of divided images, the image that is displayed by writing the same image data to the pixels corresponding to the two or more simultaneously selected scan lines and the image displayed by writing the image data to the pixel corresponding to the scan line selected one by one.

6. The display system as claimed in claim 2, wherein the controller:

includes, in the two or more types of images displayed sequentially, a secret image that can be recognized only by a specific person, an inversed image which can generate an image of uniform brightness by being superimposed on the secret image, and a public image that can be recognized by unspecified people; and writes the same image data to the pixels corresponding to the two or more simultaneously selected scan lines to display at least the public image on the display screen.

7. The display system as claimed in claim 2, wherein the controller sets an image display period to which a display method that simultaneously selects the two or more scan lines is employed to be shorter than an image display period to which the display method is not employed.

8. The display system as claimed in claim 1, wherein the controller sets an image display period to which a display method that displays the image by writing the same image data to the two or more simultaneously selected pixels is employed to be shorter than an image display period to which the display method is not employed.

9. The display system as claimed in claim 1, wherein the controller sets a maximum driving frequency required for writing the same image data to the two or more simultaneously selected pixels to be equal to or smaller than a maximum driving frequency required for writing the image data to the individually selected pixels.

10. The display system as claimed in claim 1, wherein the controller sets at least one type of clock frequency out of various types of clock frequencies used when controlling timing for displaying the two or more types of sequentially displayed images to be uniform regardless of the display method of the two or more types of images.

11. The display system as claimed in claim 10, wherein the controller takes a frequency for transferring the image data to a plurality of data lines, a horizontal synchronous frequency when scanning a plurality of scan lines, and a vertical synchronous frequency, or a dot clock required for display driving as the clock frequency used for controlling the timing for displaying the two or more types of sequentially displayed images.

12. The display system as claimed in claim 1, wherein, for the two or more types of sequentially displayed images, the controller sets various types of clock frequencies used when controlling timing for displaying the images by writing the same image data to the two or more pixels, various types of clock frequencies used for controlling timing for displaying the image by simultaneously selecting the two or more scan lines, or various types of clock frequencies used for controlling timing for displaying the image by simultaneously inputting the image data by simultaneously selecting the two or more data lines, and various types of clock frequencies used for controlling timing for displaying the image without employing the display method to be in a relation that can be generated by multiplication or division at least in one type of the clock frequency.

13. The display system as claimed in claim 1, wherein the controller sets a period from a writing end point of a given image data to a writing start point of a next image data when writing the same image data to the two or more simultaneously selected pixels to be longer than the period for writing image data sequentially to the individually selected pixels.

14. The display system as claimed in claim 1, wherein the controller sets a period from a writing end point of a given image data to a writing start point of a next image data when writing the same image data to the two or more simultaneously selected pixels to be almost uniform within one frame.

15. The display system as claimed in claim 1, wherein the controller:

includes, in the two or more types of sequentially displayed images, a secret image that can be recognized only by a specific person; and sets periods where the specific person can recognize the secret image to be almost uniform.

16. The display system as claimed in claim 1, wherein the controller:

includes, in the two or more types of sequentially displayed images, a secret image that can be recognized only by a specific person and a public image that can be recognized by unspecified people; and sets periods where the specific person can recognize the secret image to be almost uniform.

17. The display system as claimed in claim 1, wherein the controller:
includes, in the two or more types of sequentially displayed images, a secret image that can be recognized only by a specific person; and
uses an optical shutter for allowing only a user of the optical shutter to recognize the secret image.

18. The display system as claimed in claim 17, wherein the controller sequentially switches and displays the secret image that can be recognized only by the specific person and the inversed image that generates an image of uniform brightness by being superimposed on the secret image, which are included in the two or more types of sequentially displayed images, and sets display timing of the inversed image to be same as timing of the corresponding secret image.

19. The display system as claimed in claim 1, wherein the controller controls to display the images by switching a mode which displays one type of image and a mode which sequentially displays two or more types of images.

20. The display system as claimed in claim 19, wherein the controller sets various types of clock frequencies used when controlling display timing of the mode which displays one type of image and various types of clock frequencies used when controlling display timing for displaying two or more types of images to be same or in a relation that can be generated by multiplication or division at least in one type of the clock frequency.

21. The display system as claimed in claim 19, wherein the controller takes a frequency for transferring the image data to a plurality of data lines, a horizontal synchronous frequency when scanning a plurality of scan lines, and a vertical synchronous frequency, or a dot clock required for display drive as the clock frequency used for controlling the timing for displaying the two or more types of sequentially displayed images.

* * * * *